US012596203B2

(12) United States Patent
Durand Riard et al.

(10) Patent No.: US 12,596,203 B2
(45) Date of Patent: Apr. 7, 2026

(54) LAYERING FOR GEOMODELING

(71) Applicant: TotalEnergies OneTech, Courbevoie (FR)

(72) Inventors: Pauline Durand Riard, Courbevoie (FR); Aurèle Forge, Courbevoie (FR)

(73) Assignee: TOTALENERGIES ONETECH, Courbevoie (FR)

( * ) Notice: Subject to any disclaimer, the term of this patent is extended or adjusted under 35 U.S.C. 154(b) by 929 days.

(21) Appl. No.: 17/758,557

(22) PCT Filed: Jan. 22, 2020

(86) PCT No.: PCT/IB2020/000071
§ 371 (c)(1),
(2) Date: Jul. 8, 2022

(87) PCT Pub. No.: WO2021/148830
PCT Pub. Date: Jul. 29, 2021

(65) Prior Publication Data
US 2023/0043782 A1 Feb. 9, 2023

(51) Int. Cl.
*G01V 20/00* (2024.01)
(52) U.S. Cl.
CPC .................................... *G01V 20/00* (2024.01)
(58) Field of Classification Search
CPC ....................................................... G01V 20/00
See application file for complete search history.

(56) References Cited

U.S. PATENT DOCUMENTS 8,965,745 B2 2/2015 Lepage
2004/0220789 A1 11/2004 Thore et al.
(Continued)

FOREIGN PATENT DOCUMENTS

EP 0254325 A2 1/1988
EP 2539740 A1 1/2013
(Continued)

OTHER PUBLICATIONS

Santoshini, Samita, et al. "SPE-191615-18RPTC-MS." (2018). (Year: 2018).*
(Continued)

*Primary Examiner* — Saif A Alhija
(74) *Attorney, Agent, or Firm* — Hamilton, Brook, Smith & Reynolds, P.C.

(57) ABSTRACT

The invention notably relates to a computer-implemented method of geomodelling. The method comprises providing a pseudo-stratigraphic grid representing a reservoir having geological units and having pillars which each include respective cells. Each geological unit is represented by a respective portion of the pseudo-stratigraphic grid, and each geological unit has a respective top, a respective base, and a respective stratigraphic style. The method then comprises, for at least one geological unit, computing a top 2D map abase 2D map, defining a gridding constraint, and for each cell of the respective portion, calculating a respective local stratigraphic layering index. The calculation of the respective local stratigraphic layering index is based on the top 2D map, on the base 2D map, on the gridding constraint and on the respective stratigraphic style. This provides an improved solution of geomodeling.

18 Claims, 12 Drawing Sheets

(56) References Cited

U.S. PATENT DOCUMENTS

| | | | | | |
|---|---|---|---|---|---|
| 2008/0195319 | A1* | 8/2008 | Wilkinson | ............. | G01V 1/282 |
| | | | | | 702/6 |
| 2011/0310101 | A1 | 12/2011 | Prange et al. | | |
| 2012/0022837 | A1 | 1/2012 | Asbury et al. | | |
| 2012/0215513 | A1 | 8/2012 | Branets et al. | | |
| 2012/0265510 | A1* | 10/2012 | Lepage | ................. | G01V 20/00 |
| | | | | | 703/9 |
| 2013/0218539 | A1* | 8/2013 | Souche | ................... | G06F 30/20 |
| | | | | | 703/2 |
| 2013/0262052 | A1 | 10/2013 | Mallet et al. | | |
| 2014/0136171 | A1 | 5/2014 | Sword et al. | | |
| 2016/0054472 | A1 | 2/2016 | Thore | | |
| 2016/0103246 | A1 | 4/2016 | Freeman et al. | | |
| 2016/0180582 | A1 | 6/2016 | Forge et al. | | |
| 2023/0057978 | A1 | 2/2023 | Forge et al. | | |

FOREIGN PATENT DOCUMENTS

| | | | |
|---|---|---|---|
| EP | 2653893 | A1 | 10/2013 |
| EP | 2869096 | A2 | 5/2015 |
| EP | 3106900 | A1 | 12/2016 |
| FR | 2952210 | A1 | 5/2011 |
| FR | 3036210 | A1 | 11/2016 |
| WO | 201471321 | A1 | 5/2014 |
| WO | 2018125620 | A1 | 7/2018 |
| WO | 2021148832 | A1 | 7/2021 |

OTHER PUBLICATIONS

Caumon, Guillaume, and Jean-Laurent Mallet. "3D Stratigraphic models: representation and stochastic modelling." Int. Assoc. for Mathematical Geology—XIth International Congres. 4p. 2006. (Year: 2006).*

International Search Report and Written Opinion for International Appl. No. PCT/IB2020/000071, entitled "Layering For Geomodeling," consisting of 9 pages. Date of Mailing: Oct. 7, 2020.

Peyrot, J., et al, "Hexashrink, An Exact Scalable Framework For Hexahedral Meshes With Attributes And Discontinuities: Multiresolution Rendering And Storage Of Geoscience Models," arxiv.org, Cornell University Library, pp. 3-5 (2019).

Gringarten, E. et al., "New Geologic Grids For Robust Geostatistical Modeling Of Hydrocarbon Reservoirs," SPE Annual Technical Conference and Exhibition, p. 2, paragraph "3D Reservoir Grids— State of the Art", 9 pages (2008).

Pimenta, I. et al., "Construction and Validation of an integrated 3D Geomodel for Reservoir Characterization", 9th International Congress of the Brazilian Geophysical Society & Expogef, Salvador, Bahia, Brazil, Sep. 11-14, , pp. 1-6 (2005).

Aguilar, Rosa Ma, et al. "Handling Complex Stratigraphic Relationships Using vol. Based Modeling and Stair-Step Grids." AAPG International Conference & Exhibition. Society of Exploration Geophysicists and American Association of Petroleum Geologists., Barcelona Spain. 2017. (Year: 2017).

* cited by examiner

1000

1010

CPU

1070

RAM

1020

Mass storage
devices controler

Display

1080

1030

Hard
drive

CDROM

B
U
S

Haptic device

1090

1040

Network Adapter

Video
RAM

1100

1050

Network

GPU

1060

1110

$$\alpha_i = \frac{h_i}{Hi} \qquad \alpha = \frac{1}{4}\sum_{i=1}^{4}\alpha_i$$

LAYERING FOR GEOMODELING

This application is the U.S. National Stage of International Application No. PCT/IB2020/000071, filed Jan. 22, 2020, and published in English. The entire teachings of the above application is incorporated herein by reference.

FIELD OF THE INVENTION

The invention relates to the field of geomodeling, and more particularly to computer-implemented methods, programs and systems for performing geomodeling based on a pseudo-stratigraphic grid representing a reservoir, for example for the purpose of geological simulations in the context of oil and/or gas production.

BACKGROUND,

Geomodeling (or geologic modeling) refers to methods for determining data representing a geological environment, including for example determining data configured for geological simulation and/or performing geological simulation.

Geological simulation refers to all techniques for performing computer simulations related to a geological environment. These techniques assist actors by providing them with computerized representations of real, estimated or predicted states and/or processes related to the geological environment. Geological simulation techniques include geostatistical simulations. Geostatistical simulations may for example determine a distribution of petrophysical properties of the reservoir, e.g. including facies, porosity, permeability, and/or fluid saturations. Geological simulation techniques also include dynamic simulations, such as hydrocarbon flow simulation (which may simply be referred to as "flow simulation"). Flow simulation provides useful information as to how hydrocarbons (i.e. gas and/or oil) flow in a reservoir environment. Flow simulation may for example represent real, estimated or predicted pressure, saturations, flow paths, flow rates, flowing compositions, and/or evolutions of these quantities over time.

In many existing solutions, geological simulations are performed based on geological simulation grids (also referred to as "geomodels"). A geological simulation grid comprises a geometrical grid which represents a geological environment, such as a hydrocarbon reservoir. The geometrical grid may conform to shapes of geological structures, such as horizons, fault surfaces, channels and/or reservoirs. For example, horizons may correspond to layer structures of the geometrical grid and fault surfaces may correspond to stair-stepped structures of the geometrical grid. Geological simulation grids may further comprise parameters (also referred to as "properties") which represent geological properties of the geological structures, such as flow parameters, and which are assigned to geometrical structures of the geometrical grid. A geological simulation grid may be inputted to a simulator which performs the simulation, according to the shapes of the geometrical grid and/or to the values of the geological properties conveyed by the parameters.

Because of the size of the geological environments and the numbers of geological structures at stake and mesh quality requirements on one side, and the geometric constraints required for simulations, such as cell isotropy and cell orthogonality, designing a geological simulation grid is a tedious task. Another constraint for minimizing the simulations time is the total number of cells. Geometrical grids may indeed comprise more than ten million of cells in some situations. For these reasons, only part of the available geological information is used at the time of the initial design. Also, approximations and errors are made. As a consequence, the result of an initial design is most often inaccurate, in the sense that simulations performed on the basis of a designed geological simulation grid are most often inaccurate. In order to improve accuracy in an efficient manner, existing solutions offer tools for configuring the geological simulation grid (i.e. adding new parameters to the grid and/or modifying existing parameters assigned to geometrical structures of the grid), rather than modifying the geometrical grid shape.

Some solutions propose to represent the reservoir with a geometrical grid which is a pure stratigraphic grid, in other words, a grid perfectly consistent with a stratigraphy and which is either hexahedral or tetrahedral or any others 3D closed polygons. When the grid is hexahedral, perfect consistency with the stratigraphy results in cell distortions. When the grid is tetrahedral, such as proposed by software Petrel and SKUA (registered trademarks), the cell-to-cell topology is complex and physics in more difficult to represent. In any cases, simulations perform poorly due to time-consuming computations and/or are inaccurate due to the distortions or topology complexity.

Some other solutions use pseudo-stratigraphic grids in order to represent a reservoir. Pseudo-stratigraphic approaches enable to model complex geology (e.g. faults and/or complex stratigraphy) with classical hexahedral grids. The use of the pseudo-stratigraphic grid indeed makes it possible to model discordant geological units (also referred to as "stratigraphic units") implicitly in a so-called "sugar box" grid in order to avoid grid distortions, while respecting a stratigraphic filling along isochrones. However, the resulting layering often lacks geological meaning. The use of the grid alone to apply simulation algorithms may lead to unsatisfactory results. Thus, the geological simulation grid may rather be enriched with additional data before the simulation.

There is thus a need for improved solutions of geomodeling based on a pseudo-stratigraphic grid representing a reservoir, and in particular for determining information that allows configuration of a pseudo-stratigraphic grid for simulations, such as geostatistical and/or dynamic (e.g. flow) simulations.

SUMMARY OF THE INVENTION

It is therefore provided a computer-implemented method of geomodelling. The method comprises providing a pseudo-stratigraphic grid. The pseudo-stratigraphic grid represents a reservoir having geological units. The pseudo-stratigraphic grid has pillars. Each pillar includes respective cells. Each geological unit is represented by a respective portion of the pseudo-stratigraphic grid, and each geological unit has a respective top, a respective base, and a respective stratigraphic style. The method then comprises, for at least one geological unit, computing a top 2D map a base 2D map, defining a gridding constraint, and for each cell of the respective portion, calculating a respective local stratigraphic layering index. The top 2D map represents the respective top, and the base 2D map represents the respective base. The gridding constraint depends on the respective stratigraphic style. The calculation of the respective local stratigraphic layering index is based on the top 2D map, on the base 2D map, on the gridding constraint and on the respective stratigraphic style.

In examples, the method may comprise one or more of the following:

the at least one geological unit comprises several geological units that form the reservoir, the method further comprising determining, for each cell of the pseudo-stratigraphic grid, a respective global stratigraphic layering index based on the respective local stratigraphic layering index and on a global recombination scheme;

the method further comprises providing, for each cell of the respective portion, a respective initial stratigraphic layering index, and replacing the respective initial stratigraphic layering index;

the top and or the base has a first region and a second region complementary to the first region, the top and/or the base 2D map outputs, for each cell of the top and/or the base, a respective local stratigraphic value, and the computing of the top and/or the base 2D map includes, for each first cell of the first region, determining a respective first stratigraphic layering index based on the respective initial stratigraphic layering index, and, for each second pillar intercepted by the second region, determining a respective second stratigraphic layering value by interpolating first stratigraphic layering values;

the second region presents a discontinuity, the reservoir optionally comprising a geological structure which intersects the surface and yields the discontinuity;

the geological structure is a fault or an unconformity;

the method comprises detecting faulted cells of the top or the base based on topology of the pseudo-stratigraphic grid;

the respective stratigraphic style is a true iso-proportional style;

the top 2D map and/or the base 2D map each output, for each pillar intercepting the at least one geological unit, a respective value of a vertical positioning measure, the calculating including: establishing a respective pseudo relative depositional time based on a comparison between a respective value of the vertical positioning measure at the cell and the respective value outputted by the first and/or base 2D map, and converting the respective pseudo relative depositional time into the respective local stratigraphic layering index based on the gridding constraint and/or a comparison between the top 2D map and the base 2D map, the establishing and the converting being performed further based on the respective stratigraphic style;

the respective stratigraphic style is a true iso-proportional style or an iso-proportional with geometrical option style, and/or the gridding constraint is a target number of cells, the converting including multiplying the target number of cells with the respective pseudo relative depositional time; and/or the respective stratigraphic style is a follow-top style or a follow-base style, and/or the gridding constraint is a target cell thickness, the converting including multiplying a max of the difference between the top 2D map and the base 2D map with the respective pseudo relative depositional time, divided by the target cell thickness.

In examples, the method may further comprise designing a geological simulation grid configured for any geological simulation, for example any geostatistical simulation and/or any dynamic (e.g. flow) simulation. The expression "designing a geological simulation grid" designates any operation participating to reaching a geological simulation grid configured for one or more types of simulations, including but not limited to designs performed from scratch. The method may notably comprise providing an initial geological simulation grid, and the provided pseudo-stratigraphic grid may be the geometrical grid of such initial geological simulation grid. The method may then comprise configuring the geological simulation grid based on the determined data. Alternatively, the method may comprise constructing a geological simulation grid with the pseudo-stratigraphic grid as a geometrical grid, and further configuring the geological simulation grid based on the determined data.

In such examples, the method may further comprise performing one or more simulations based on the geological simulation grid. The one or more simulations may include any geological simulation, for example any combination of one or more geostatistical simulations and/or one or more dynamic (e.g. flow) simulations.

It is further provided a computer program comprising instructions for performing the method.

It is further provided a data structure representing any information obtainable by the method, such as a geological simulation grid designable or designed by the method and/or a result of a simulation performable or performed by an example of the method which includes one or more simulations.

It is further provided a data storage medium having recorded thereon the computer program and/or the data structure.

It is further provided a system comprising a processor coupled to a memory, the memory having recorded thereon the computer program and/or the data structure. The system may further comprise a display configured for displaying outputs of the method and/or a graphical user interface for entering inputs of the method.

It is further provided a hydrocarbon production process which comprises performing one or more iterations of the method. The process also comprises producing hydrocarbon based on the one or more iterations.

BRIEF DESCRIPTION OF THE DRAWINGS

Embodiments will now be described, by way of non-limiting example, and in reference to the accompanying drawings, where.

DETAILED DESCRIPTION

Figure 1:
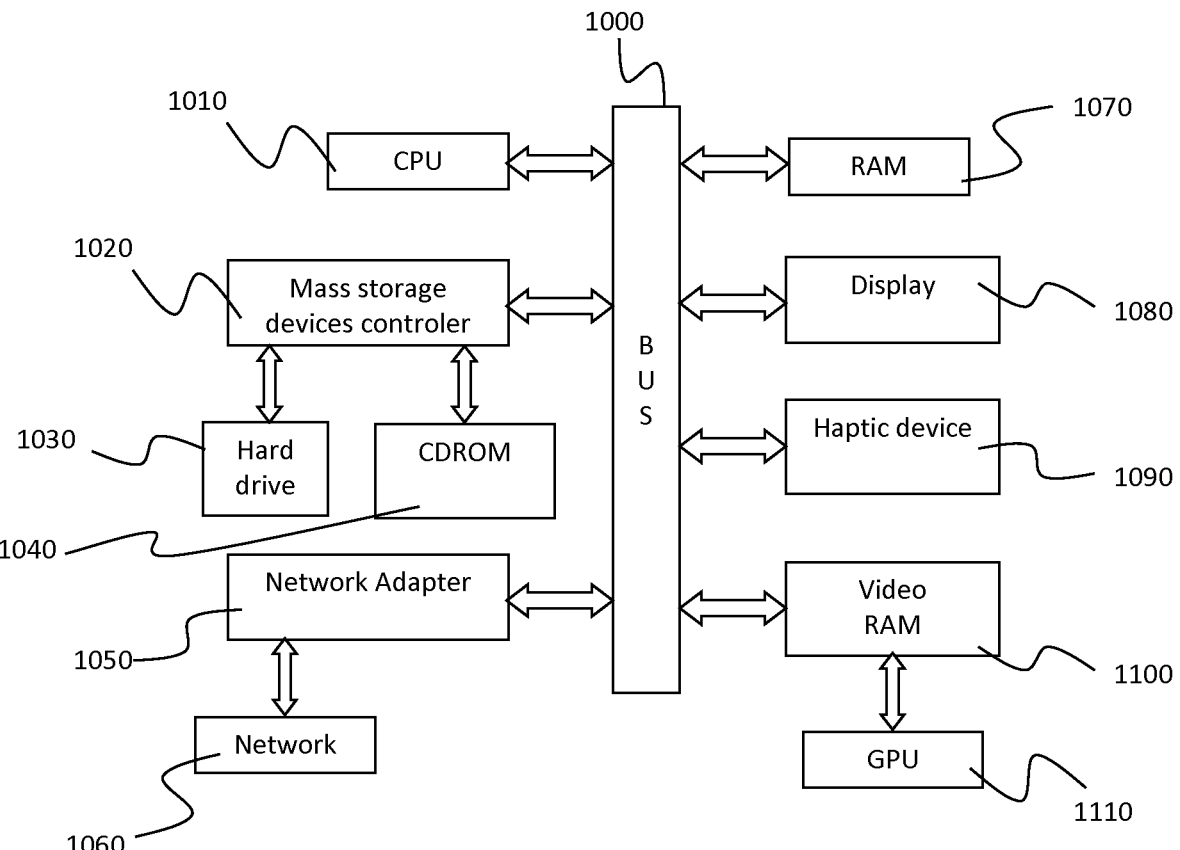
FIG. 1 shows an example of the system.

The present disclosure relates to different methods, including a so-called "painting method" and a so-called "layering method". The methods are both computer-implemented methods of geomodeling, and they both comprise providing a pseudo-stratigraphic grid representing a reservoir. The reservoir has geological units. The grid has pillars. Each pillar includes respective cells.

In the painting method, each cell has a respective stratigraphic layering index. The method comprises, after providing the pseudo-stratigraphic grid, providing a surface having a first region and a second region. The second region is complementary to the first region. For each first pillar intercepted by the first region, the method comprises determining a respective first stratigraphic layering value based on the relative position of the surface in the first pillar. And for each second pillar intercepted by the second region, the method comprises determining a respective second stratigraphic layering value by interpolating and/or extrapolating first stratigraphic layering values.

The painting method forms an improved solution of geomodeling. Notably, the method allows configuring the pseudo-stratigraphic grid by adding data representative of a surface. This is performed by locating the surface relatively to the pseudo-stratigraphic grid, thanks to determining the first and second stratigraphic layering values. The surface is thereby said to be "painted" in the pseudo-stratigraphic grid. Such information can be used to create one or more new geological units delimited by the surface and/or represent the surface during simulations. Furthermore, the method allows handling cases where the specifications of the surface are not reliable everywhere for such determination. In particular the method handles the case of a surface having a first region and a second region complementary one to another, the method relies on the first region to determine first values, and the method uses the first values determined for the first region to determine the second values for the second region. This is performed specifically by interpolating and/or extrapolating first stratigraphic layering values. Since the second region is complementary to the first region, such interpolating and/or extrapolating yields accurate second stratigraphic layering values, consistent with the first stratigraphic layering values. The global result is thus geologically consistent and representative of a plausible surface.

In the layering method, each geological unit is represented by a respective portion of the pseudo-stratigraphic grid. Also, each geological unit has a respective top, a respective base, and a respective stratigraphic style. The method comprises, after providing the pseudo-stratigraphic grid, a scheme (also referred to as "local layering" in the following) performed for at least one geological unit. The scheme comprises, for each geological unit of the at least one geological unit, computing a top 2D map representing the respective top (of the geological unit) and a base 2D map representing the respective base (of the geological unit). The scheme also comprises defining a gridding constraint depending on the respective stratigraphic style. And the scheme also comprises, for each cell of the respective portion (representing the geological unit), calculating a respective local stratigraphic layering index based on the top 2D map, on the base 2D map, on the gridding constraint and on the respective stratigraphic style (of the geological unit).

The layering method forms an improved solution of geomodeling. Notably, the method allows configuring the pseudo-stratigraphic grid by adding data representative of layering information relative to a respective geological unit. This is performed by determining the stratigraphic layering index for each cell of a portion of the grid representing the respective geological unit. The portion of the grid representing the geological unit is said to be "layered" in the stratigraphic domain (i.e. the geological domain). Such information can be used to represent stratigraphy during simulations. Furthermore, the method obtains such layering information based on the geometrical information relevant to the geological unit (that is, the top 2D map and the base 2D map), and further based on the stratigraphic style (by defining a corresponding gridding constraint). Thanks to this, the layering performed by the method is accurate.

Both the painting method and the layering method take the approach of performing geomodeling with a pseudo-stratigraphic grid representing a reservoir. As a result, computations involved in simulations are performed relatively simply, and simulations based on the grid are thus relatively rapid, robust and accurate. Both methods allow determining information to add to the grid accurately. As a result, the methods allow accurate configuration of a pseudo-stratigraphic grid for improved simulations, such as geostatistical and/or dynamic simulations.

The painting method and/or the layering method may in examples comprise performing a display based on results of the method. For example, the painting method may comprise displaying a graphical representation of the surface in a graphical representation of the grid, based on the determined first and second values. The layering method may comprise displaying a graphical representation of the calculated layering in a graphical representation of the grid (e.g. using different colors to distinguish cells of different layering indices).

The painting method and the layering method may be performed iteratively and interlaced on the same pseudo-stratigraphic grid, thereby iteratively configuring and enriching the pseudo-stratigraphic grid with surface or layering information at each iteration. At each iteration of the painting method, the provided surface may be a new surface (i.e. different from all surfaces provided at previous iterations). The determining may be performed based on existing stratigraphic layering index information, for example coming from a previous iteration of the layering method. At each iteration of the layering, the at least one geological unit may be new (i.e. comprising at least one geological unit different from all geological units considered at previous iterations). The local layering may be performed based on at least one existing geological unit representation, the new at least one geological unit being for example defined based on the painting performed at a previous iteration of the painting method. In examples, the painting method allows to represent one or more new geological units in the grid which are delimited by the painted surface. For example, one or more horizons may be painted in a geological unit already represented in the grid, and the horizons may delimit subunits of the geological unit (a subunit being itself seen as a geological unit). The layering method may then be applied to such new subunits.

The providing of the pseudo-stratigraphic grid is now discussed. The discussion applies to both the painting method and the layering method.

The reservoir may be any geological environment of interest, for example any subsoil, for example a subsoil comprising, consisting or forming a part of one or more hydrocarbon fields, such as oil and/or gas field(s).

The geological environment comprises geological structures. A geological structure is a formation in the geological environment that is of interest to any geological phenomenon that may occur in the geological environment. Any geological structure contemplated by any method herein may be a reservoir, a horizon, an unconformity, an intrusion, a channel, a salt diapirism, a fold, a fault, a geological unit, or yet a zone of steam presence or a front surface thereof in a steam-assisted gravity drainage (SAGD) situation. Any geological structure contemplated by any method herein may consist of or be delimited by one or more geological surfaces.

Any geological surface herein may for example be a fault surface, a horizon surface, a geological body surface—such as a reservoir property boundary surface, a salt diapirism surface, or a channel surface—, or a front surface of a steam presence zone. A geological surface may be of a dimension superior to 100, 1 000 or 10 000 m² and/or inferior to 10 000 000 or 100 000 000 m², for example of the order of 1 000 000 000 m² or 100 km² (e.g. ±50%, 25% or 10%).

The pseudo-stratigraphic grid is a data structure that represents the geological environment by a spatial distribution of geometrical cells. The pseudo-stratigraphic grid and/or the geometrical cells are three-dimensional. Each geometrical cell represents a respective real cell of the geological environment. All or a part of the geometrical cells of the geometrical grid may be of a cuboid or an at least substantially cuboid shape (i.e. hexahedral cells). One or more of the dimensions of all or a part of the geometrical cells may be superior to 1 meter, 2 meters, or 5 meters and/or inferior to 1000 meters, 500 meters, or 200 meters. The geometrical cells may for example be of a cuboid shape, and/or of dimensions of the order of 80 meters x 80 meters×10 meters (e.g. ±50%, 25% or 10% for each dimension). The geometrical grid may comprise more than 10 000, 100 000 or yet 1 000 000 geometrical cells. The geometrical grid may comprise less than 100 000 000 or 50 000 000 cells. The number of cells may be of the order of 10 000 000 (e.g. ±50%, 25% or 10%). All, substantially all, or at least a majority of the cuboid cells may be positioned horizontally or at least substantially horizontally. The pseudo-stratigraphic grid is non-regular, but it may be structured.

The geometrical grid may optionally conform to a reference set of geological structures of the geological environment. This means as known per se that the gridding is constrained by the reference set of geological structures, such that for each given geological structure of the set, a corresponding geometrical structure of the geometrical grid conforms to the given geological structure. Optionally, such geometrical structures may be marked accordingly, that is to convey such correspondence information. The surface provided in the painting method may represent a geological surface not belonging to the reference set, such that the pseudo-stratigraphic grid may be non-conforming to the surface. Similarly, the at least one geological unit subject to the local layering in the layering method may be a geological unit not belonging to the reference set or not delimited by geological structures belonging to the reference set, such that the pseudo-stratigraphic grid may be non-conforming to the geological unit.

A geometrical structure of the geometrical grid is any one or any combination of one or more cells, one or more faces, one or more edges, and/or one or more vertices. A geometrical structure conforms to a given geological structure when the geometrical structure matches at least substantially the given geological structure. A given geometrical structure matches at least substantially a given geological structure when the spatial discrepancy between the given geometrical structure and the given geological structure is inferior or equal to a predetermined threshold.

The spatial discrepancy may for example be measured as the Hausdorff distance between surfaces representing respectively the given geometrical structure and the given geological structure. In such a case, the predetermined threshold may be a value above 1 m or 10 m and/or below 25 m or 50 m. The spatial discrepancy may alternatively be measured as the sum, over all grid cells intersected by the surface representing the given geological structure, of the absolute cell volumes displaced across the surface representing the given geological structure by position discrepancy with respect to the given geometrical structure. In such a case, the predetermined threshold may be a value above 10 $m^3$ or 100 $m^3$ and/or below 500 $m^3$ or 1000 $m^3$ times the number of affected cells.

The pseudo-stratigraphic grid may be a grid obtainable based on the reference set of geological structures (e.g. excluding the use of any other geological structure data). For example, providing the pseudo-stratigraphic grid may comprise, providing a structural model representing the reference set of geological structures (e.g. built from scratch, retrieved from a memory or received from a distant system), and then gridding the structural model, thereby obtaining the pseudo-stratigraphic grid. Alternatively, the result of such a prior stage may be provided as such, for example retrieved from a memory or received from a distant system.

The reference set of geological structures or structural model may be defined based on a geological analysis of geological or geophysical data, for example and not only seismic data. The geological data may be part or derived from seismic data, for example acquired by one or more seismic sensors, and/or during one or more seismic surveys. The acquisition and/or the analysis may be part of any method herein.

The pseudo-stratigraphic grid allows defining a geological simulation grid when provided with additional data. The geological simulation grid is configured for one or more geological simulations contemplated to be performed with respect to the geological environment. The geological simulation grid may optionally also comprise parameters assigned to geometrical structures of the pseudo-stratigraphic grid and that represent geological properties. The pseudo-stratigraphic grid and its possibly assigned parameters are adapted to be inputted to one or more simulators, which may in any known way perform simulations based upon the available data.

The one or more simulations may comprise one or more geostatistical simulations and/or one or more dynamic (e.g. flow) simulations. The location of the surface outputted by the painting method can be used for determining one or more geological unit(s) and/or one or more subunit(s) delimited by the surface, which may constrain the simulations. The layering of the at least one geological unit outputted by the layering method can be used for filling cells with relevant petrophysical properties (according to their stratigraphic layering) at initialization of the simulations.

The objective of a geological grid is to represent accurately the evolution of the properties of the sub-surface that will affect the flow of fluids, including hydrocarbon. These properties include porosity, net-to-gross, saturation, and/or permeability. On the first order they are strongly driven by subsequent geological process responsible for rock deposition that is consistent along the stratigraphy, at the scale of the reservoir. Different stratigraphic unit can be individualized within a reservoir, each of them having a specific geological environment and specific flow characteristic. In addition, within each unit the sediment are organized differently controlled by the stratigraphy and responsible for smaller scale heterogeneities. It is therefore useful to represent these stratigraphic units that will be modeled differently. Then, the stratigraphic style of each unit will impact the way the heterogeneities are distributed within a unit, and therefore its dynamic behavior.

These properties can be constrained by "hard data", i.e. data derived from wells that must be honor, and/or "soft data", trends derived from seismic and/or geological concept and/or knowledge from analogs. Geostatistics proposes a robust mathematical framework to distribute them spatially while honoring all these constrains and managing uncertainty. Many geostatistical methods exist and they are chosen given the type of property to model and/or the number and quality of data and/or the geological environment. These different approaches all rely at some point on the notion of distance, via the concept of variogram or any kind of spatial correlation. The correlation is enhanced along the stratigraphy and increased in opposite direction. Therefore providing a robust description of the stratigraphy spatially enables to obtain a robust distribution of heterogeneities, at all scales.

The geological simulation grid may notably be configured for hydrocarbon flow simulation in a geological environment. As known per se, hydrocarbon flow simulation or "flow simulation" designates any process which simulates how fluids including hydrocarbon flow in the geological environment.

In examples, the geological simulation grid may be configured for finite volume hydrocarbon flow simulation, and optionally one or more (e.g. each) flow simulation performed by any method herein may be a finite volume hydrocarbon flow simulation. As known per se, finite volume flow simulation is a specific type of flow simulation which takes as input a geological simulation grid including a pseudo-stratigraphic grid having cells, and which comprises an iterative calculation to compute a discrete step by step evolution or cell properties from which flow may be derived, based on one or more parameters assigned (e.g. during the simulation or beforehand) to geometrical structures of the pseudo-stratigraphic grid. At each time step of the simulation, properties are uniform within each cell of the model, such that finite volume simulation does not necessitate and excludes discretization of cells during the iterative calculation. In particular, during finite volume simulation, the pseudo-stratigraphic grid of the geological simulation grid may remain constant (i.e. geometry of the cells is not modified). As a result, finite volume simulation performs relatively fast (for example compared to other numeric schemes such as finite element algorithms). Also, the results between different simulations are easily comparable since they pertain to the same meshing of the environment (the geometry of the cells being unmodified).

The geological simulation grid may thus in examples form a numerical reservoir simulation model which is a discretized model of a reservoir containing oil, gas, water or any combination, subdivided into cells. Each of the cells represents a corresponding volume of the reservoir. Cells are either connected or disconnected to other cells, geometric neighbors or not, so that fluid may flow from cell to cell. The fluids and rocks descriptions and distributions may be included in the model in the form of cell properties or look up tables. The simulation process is a computerized iterative calculation that takes injected volumes and constraints in producers/injectors bottom hole pressures to compute a discrete step by step evolution of pressure and saturations in each cell of the model. The time step may correspond to the time required to fill the smallest cell.

The simulation may output the following data:
the average field pressure as a function of time;
the total field cumulative oil, water and gas production profiles with time;
the total field daily (weekly, monthly, annual) production rates of each phase: oil, water and gas;
the individual well pressures (bottom hole or, through lift curves, wellhead) over time;
the individual well cumulative and daily flowrates of oil, water and gas with time;
either full field or individual well watercuts, GORs, O/W ratios with time; and/or
the spatial distribution of oil, water and gas saturations throughout the reservoir as functions of time i.e. $So(x, y,z;t)$, $Sw(x,y,z;t)$ and $Sg(x,y,z;t)$.

At every step, first the gradient of the pressure may be estimated from the current pressure values in the cells. The gradient of pressure may then be used to decide how much fluid flows from each cell to each of its connected cells.

Finally, fluid saturations may be updated and pressure may be recomputed from the new configuration.

In examples, the pseudo-stratigraphic grid may be provided with an initial set of parameters each assigned to a respective geometrical structure of the pseudo-stratigraphic grid. The initial set of parameters may represent geological properties of the reference set of geological structures to which the pseudo-stratigraphic grid conforms, and/or more generally any local property of the geological environment. Each parameter is a value of a respective property of a respective geological structure. For example, porosity, permeability, density and/or facies, net-to-gross values may be assigned to cells. Transmissibility values may be assigned to cell pairs.

Any method herein is computer-implemented. This means that steps (or substantially all the steps) of any method herein are executed by at least one computer, or any system alike. Thus, steps of any method herein are performed by the computer, possibly fully automatically, or, semi-automatically. In examples, the triggering of at least some of the steps of any method herein may be performed through user-computer interaction. The level of user-computer interaction required may depend on the level of automatism foreseen and put in balance with the need to implement user's wishes. In examples, this level may be user-defined and/or predefined.

A typical example of computer-implementation of any method herein is to perform any method herein with a system adapted for this purpose. The system may comprise a processor coupled to a memory and a graphical user interface (GUI), the memory having recorded thereon a computer program comprising instructions for performing any method herein. The memory may also store a database. The memory is any hardware adapted for such storage, possibly comprising several physical distinct parts (e.g. one for the program, and possibly one for the database).

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

One or more iterations of any method herein may be integrated in a hydrocarbon production process. The process may comprise performing one or more physical actions on the geological environment based on a result of the one or more iterations of any method herein. The one or more physical actions may comprise extracting hydrocarbon and/or injecting fluid in the subsoil to enhance extraction, fracking, performing (e.g. seismic) measurements, and/or drilling and/or operating one or more (e.g. production and/or injections) wells.

Notably, one or more (e.g. all) iterations may each include one or more hydrocarbon flow simulations. In such a case, the one or more physical actions may be based on one or more results of one or more such flow simulations. The process may for example comprise setting a value of one or more production parameters as a function of said one or more results, and then performing the one or more physical actions based on said one or more production parameter values, and at least eventually extracting hydrocarbon based on said one or more actions.

In examples, the one or more productions parameters may comprise a parameter consisting of well location information, a value of the parameter corresponding to information relative to location one or more production wells and/or one or more injections wells. In such a case, the extracting may comprise drilling new wells and/or operating already-drilled wells according to said well location information. Additionally or alternatively, the one or more productions parameters may comprise a parameter consisting of well operation information, a value of the parameter corresponding to information relative to operation of one or more production wells and/or one or more injections wells. In such a case, the extracting may comprise operating wells according to said well operation information.

In additional or alternative examples, the one or more production parameters may comprise a fracking location parameter, a fracking type parameter, a seismic measurement location parameter, and/or a seismic type parameter.

The pseudo-stratigraphic gridding concept is now discussed in more details.

As mentioned earlier, pseudo-stratigraphic approaches lead to a resulting layering which often lacks geological meaning, such that the use of the grid alone to apply (e.g. geostatistical or dynamic) simulation algorithms may lead to unsatisfactory results. One solution to avoid this consists in computing a geological layering—as a grid property—, which carries the stratigraphic information and becomes a substitute for the grid layering when working in the depositional space domain. Such layering may be obtained by applying the painting method and/or the layering method. The following discusses various situations where such layering is needed.

There is a general tendency to introduce more and more details in geomodels. There are various reasons for this:

1) Fields are intrinsically more complex as exploration and production develops frontier domains.
2) Seismic data and associated processing and integration thereof within geomodels is improving.
3) New algorithms and methods enable enhanced modeling of geological heterogeneities. Another motivation is the ability to anticipate potential issues during production history matching and forecasting by ensuring that any parameter that could affect fluid flow later on is present in the model early in the modeling process.

On the other side, standard algorithms (mainly geostatistical and flow simulation) are adapted to structured hexahedral grids and rely strongly on grid quality, essentially on cell orthogonality and isotropy as well as on cell size distribution. Meeting these requirements is often done at the expense of an accurate enough representation of the geological heterogeneities.

To reconcile these two considerations and to overcome this apparent ambiguity, a solution consists in dissociating the grid geometry and topology (i.e. its internal organization) from the true geometry of the reservoir. Grids that follow this principle are named pseudo-stratigraphic, because the cell vertical index—usually denoted k—is not related to its stratigraphic location anymore.

Figure 2:
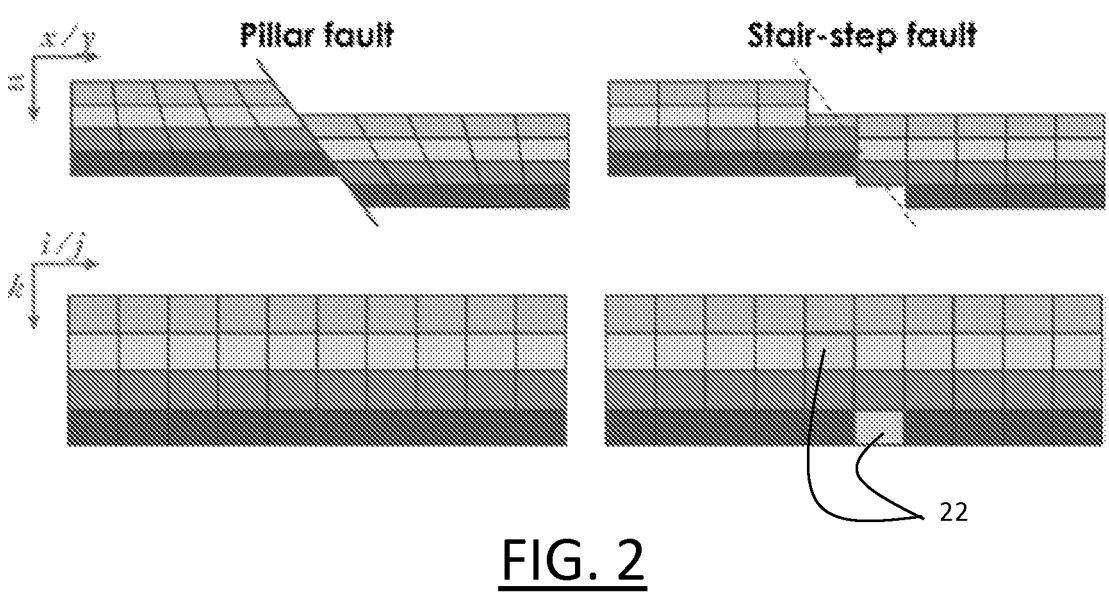
FIGS. 2-27 illustrate methods of the present disclosure.
Figure 3:
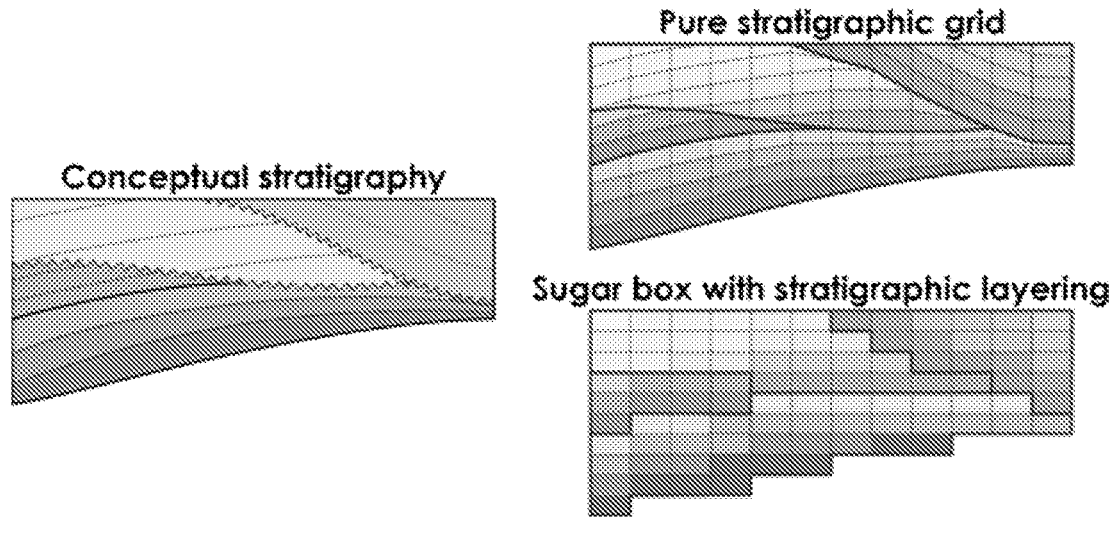

FIGS. 2-3 illustrate configurations that lead to ambiguous situations.

FIG. 2 illustrates stair-step faults, by comparing a pillar fault vs a stair-step fault. To represent any fault geometries and contacts, the grid is no more aligned on the faults but is rather torn by them, individual cells maintaining their orthogonality. Consequently, (i) faults do not appear as simple planes in the grid but rather as stair-stepped collections of cell faces, and (ii) cells can be missing near faults creating an apparent ambiguity on the unit thickness—and therefore on all related properties—even in very simple configurations. As shown on the figure, stair-step fault representation creates dead cells 22 around faults. The computation of the stratigraphic thickness in the fault vicinity is easy in the pillar fault case—just counting the number of cells for instance—but tricky in the stair-step fault case.

FIG. 3 illustrates non-stratigraphic grid layering, by comparing a pure stratigraphic grid vs a sugar box grid. When the stratigraphic organization of the reservoir is complex, explicitly introducing every stratigraphic boundary in the grid might introduce too many degenerated configurations (e.g. pinched cells, and/or highly non-coplanar faces). Usually, only a few stratigraphic limits are selected and used to build the grid and control its layering. Then, intermediate limits are painted into the grid to complete the stratigraphic column, for example with the painting method. The resulting grid is often named sugar box as the stratigraphic units cut the layering. This approach preserves mesh quality, but the generated grid layering does not represent the actual pseudo-geological time. To overcome this limitation, a stratigraphic layering, derived from the initial grid layering and accounting for all limits and deposition styles, can be computed to provide the grid with stratigraphic information, for example with the layering method. As shown on the figure, because of the reservoir stratigraphy and geometry, the pure stratigraphic approach results in a grid with very irregular cells. On the contrary, the sugar box approach succeeds in producing very regular cells by not using the stratigraphic limits during the grid construction. The grid layering does not reflect the stratigraphy so a layering property may be provided.

Thus, in pseudo-stratigraphic grids, the following assumption "the cell stratigraphic location is strictly related to its (i,j,k) coordinates within the grid" is not valid anymore. Therefore, standard approaches that rely strongly on this hypothesis should be adapted accordingly. As described above, it may now be useful to define a geological layering property that replaces the grid layering to represent the stratigraphy. The computation of such a property may be performed at the grid creation, or afterwards with the layering method.

The painting method is now discussed in more details.

Pillars of the grid are considered. A pillar consists of all cells $(i, j, k_{Grid})$ having the same indices i and j, or equivalently a pillar designates a respective i,j couple. As explained above, in addition to its respective grid layering index $k_{Grid}$, each cell further has a respective stratigraphic layering index $k_{Geol}$, either defined at the initialization of the pseudo-stratigraphic grid or later, for example by an iteration of the layering method. All indices herein are integers.

The method comprises providing a surface having a first region and a second region. By "providing a surface", it is meant the provision of specifications representing a physical and coherent surface (i.e. a real surface of the environment), such a geological surface (e.g. a horizon). The second region is complementary to the first region in the surface. In other words, the union of the first region and of the second region form the surface. Each connected part of the second region may be adjacent to at least one connected part of the first region.

The surface may be provided in the xyz domain rather than in a layering domain of the pseudo-stratigraphic grid. As a result, locating the surface in the stratigraphic layering domain is not straightforward. Indeed, a direct painting of the surface in the x,y,z domain of the grid would yield to inaccuracy, as it would not account for the approximations performed by the gridding (inherent to its pseudo-stratigraphic nature).

In order to perform a more accurate painting, the method comprises locating the surface in the stratigraphic domain of the grid. For that, the method comprises determining a respective stratigraphic layering value $k^*_{Geol}(i,j)$ for each pillar i,j intercepted by the surface. The stratigraphic layering values can be non-integers.

Namely, for each first pillar i,j intercepted by the first region (i.e. the first region of the surface is determined to intersect the portion of the subsoil represented by the pillar), the method determines a respective first stratigraphic layering value $k^*_{Geol}(i,j)$ based on the relative position of the surface in the first pillar. In other words, the surface intersects the first pillars, and the method makes use of the stratigraphic layering indices of the cells where the surface intersects the pillar. The relative position of the surface in the first pillar is deemed to be reliable (in representing stratigraphy), because it is deemed that the first pillar was not impacted during construction of the pseudo-stratigraphic grid.

Now, for each second pillar i,j intercepted by the second region, the method determines a respective second stratigraphic layering value $k^*_{Geol}(i,j)$ by interpolating and/or extrapolating first stratigraphic layering values. The relative position of the surface in the second pillar (if any) is deemed to be unreliable. Thus, rather than using the relative position of the surface in the second pillar, first stratigraphic layering values are used.

Specifically, the method comprises interpolating and/or extrapolating first stratigraphic layering values to output second stratigraphic layering values therewith. Herein, the expression "interpolating and/or extrapolating" designates any algorithm that extends coherently the domain of a function, for example iteratively, relying on already-existing values of the function.

As can be seen, the surface may be provided in the x,y,z domain and the surface intersects the first pillars in said x,y,z domain. On the opposite the surface does not necessarily intersect the second pillars in x,y,z domain. The surface may indeed merely intersect the portion of the subsoil represented by at least one second pillar. The method may comprise identifying first pillars and second pillars in any manner, based on a geological analysis of the surface. For example, the method may determine a convex hull of a projection of the surface on the x,y domain. The method may then identify the first region as part of the projection, and the second region as the complementary portion in the projection.

As mentioned earlier, the surface may be a surface which was not used when constructing the pseudo-stratigraphic grid. The surface may represent a geological surface detected based on a seismic campaign or a seismic analysis performed after the construction of the pseudo-stratigraphic grid. Or the geological surface may have been set aside at the time of said construction.

Examples of the painting method are now discussed.

The second region of the surface may present a discontinuity (in the xyz domain). The discontinuity may in fact correspond to a continuity in the stratigraphic domain. The interpolation and/or extrapolation allows to represent such continuity.

The discontinuity may be representative of a geological phenomenon making the position of the surface in the grid unreliable for determining stratigraphy. The method may comprise determining the first region and the second region. The determining may comprise defining a boundary of the second region, and optionally defining the first region as the remainder. The boundary may be defined according to a distance criterion relative to the discontinuity. The definition may be performed automatically or via user-interaction (manually or semi-automatically). The distance criterion may for example involve a cutoff distance e.g. expressed as a number of cells. The cutoff distance may be higher than 1 or 2 cells and/or lower than 10 or 5 cells. Alternatively or additionally, the distance may be defined via "rough" painting. In examples, the method may comprise determining automatically a core of the second region, and the user may be offered with the possibility to extend said core. This is illustrated by FIGS. 4-8.

Figures 4, 5, 6, 7, 8:
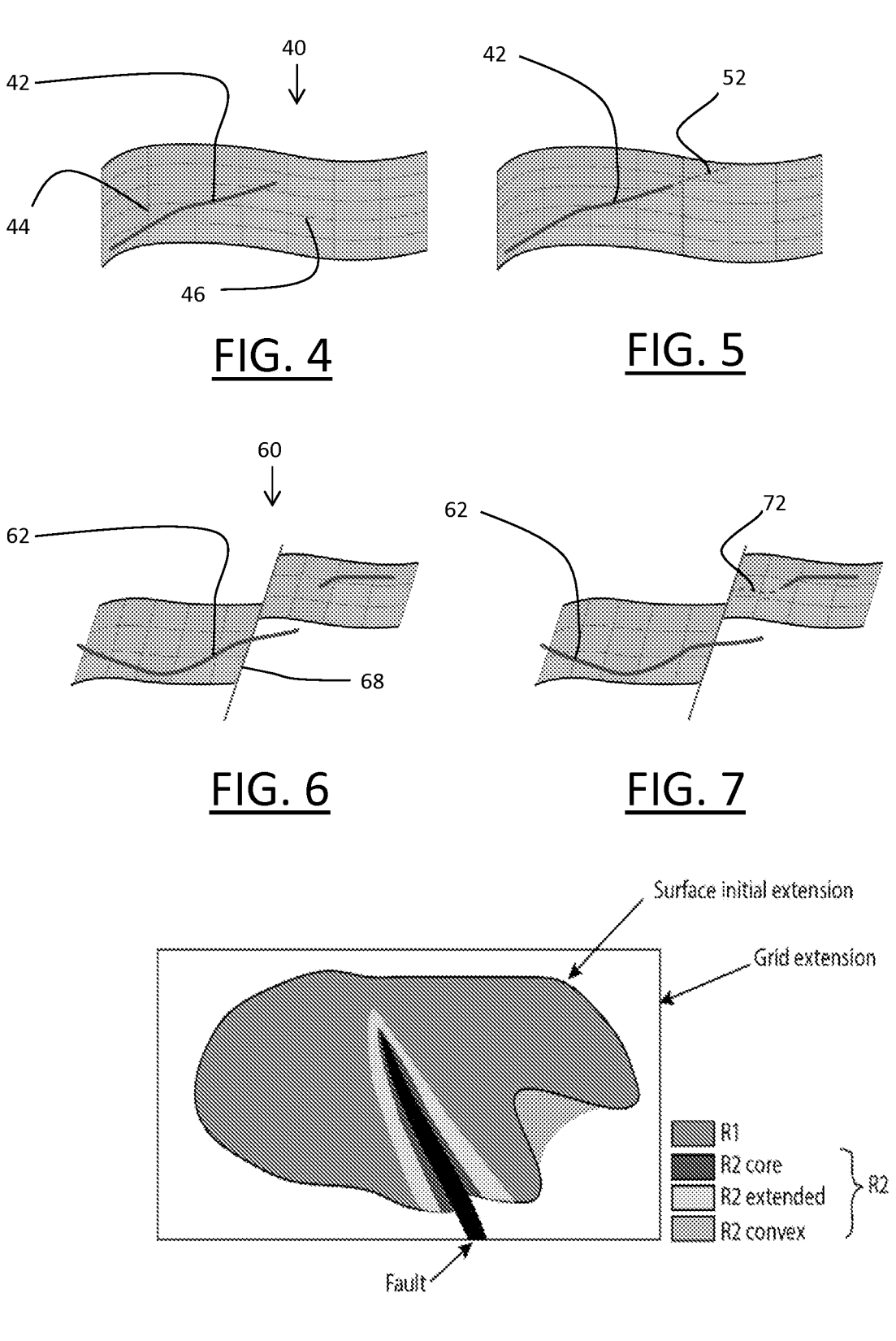

Referring to FIGS. 4-5, the method is applied for inserting horizon 42 into a grid 40. The represented situation presents a discrepancy. Indeed, horizon 42 does not follow the top or the base of any geological unit 44 or 46. It is not guaranteed that the grid and the horizon are perfectly coherent (e.g. due to a sampling problem, and/or a simplification of the grid at its creation). Thus, by naively painting the horizon in the grid (i.e. in the xyz domain), cells will not be assigned to the correct region (FIG. 4). FIG. 5 shows that the method allows by extrapolation 52 in the domain ijk to solve these ambiguities.

Referring to FIGS. 6-7, the method is applied for inserting horizon 62 into a grid 60. Near a fault 68, there may be a geometrical incoherence between the position of the fault in the grid and the position of the fault in the horizon (e.g. due to a sampling problem, and/or a simplification of the grid at its creation). Thus, by naively painting the horizon 62 in the grid 60 (i.e. in the xyz domain), cells will not be assigned to the right region (FIG. 6). FIG. 7 shows that the method allows by extrapolation 72 in the domain ijk to partly solve these ambiguities (the figure does not show how the bottom left section of the horizon 62 is shortened to handle its crossing the fault 68 in the grid domain). In this example, pieces of the horizon that are near the fault are part of the second region. They are therefore ignored and interpolated from the first region, that is to say a part of the horizon far from the fault. This amounts to cutting a piece of the horizon.

Referring to FIG. 8, the method may detect faulty cells defining the core of the R2 region. The user can add criteria to extend this region, for example if the fault is rather horizontal, its influence will be greater and cells may be added (R2 extended). In addition, in order to guarantee a more or less convex contour, a last region is created (R2 convex).

As already illustrated, the reservoir may comprise a geological structure which intersects the surface and yields the discontinuity. Such a geological structure moves geological units one relative to another so as to create a discontinuity in the xyz domain in a zone continuous in the stratigraphic domain. In examples the geological structure may be a fault or an unconformity. The pseudo-stratigraphic grid may represent the fault or unconformity with a stair-step structure. In such a case, correspondence between the xyz and the stratigraphic domain may be particularly an issue.

In particular, the surface may represent a horizon, that is, a surface substantially parallel to the stratigraphy. In such a case, impacts of a mistake in correspondence between the xyz and the stratigraphic domain may be of particular importance. In other examples, the surface may represent a fluid contact (e.g. aquifer surface, or water-gas contact), an intrusive body surface (e.g. salt, shale, volcanic), a diagenetic surface (e.g. karst), a geological body surface - such as a reservoir property boundary surface, a salt diapirism surface, or a channel surface-, or a front surface of a steam presence zone. The surface may also be user-defined, for example arbitrarily.

In examples, determining the respective first stratigraphic layering value ($k^*_{Geol}(i,j)$) comprises computing a proportion of the first pillar above the surface. The method may perform a Lagrangian interpolation in this respect, when the surface is regularly sampled. In such a case, the Lagrangian interpolation allows to have value of the horizon at any point of space. The method may consider the surface to be flat at the scale of the pillar, which allows to make calculations more quickly. The Lagrangian interpolator allows this.

The method may for each cell calculate the proportion of the cell above the surface. In extreme cases, the proportion is 0 if the cell is fully under the surface and 1 if the cell is fully above the surface. The calculation of this proportion may take into account that (1) the cell is not regular and that (2) the surface is in fact a regularly sampled 2D grid, i.e. a map whose value is known at certain points (x, y) regularly distributed.

One solution for the method is to reshape the cell into tetrahedrons and transform the horizon into a triangulated surface. The method may then calculate exactly the intersection between the cell and the surface and then calculate the actual volume of the upper and lower parts of the cell and deduce the proportion. This calculation is nevertheless relatively expensive because the intersections present any form. And in applications it may not be worth working with such a level of precision.

Figure 9:
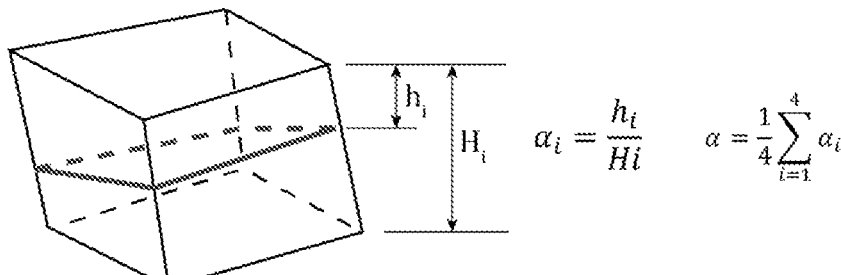

With reference to FIG. 9, a simplified approach is proposed in which the proportion of the cell above the horizon is deduced from the proportion calculated for each pillar. For each pillar, the method may calculate the proportion $\alpha_i$ of the pillar above the surface:

$$\alpha_i = \frac{h_i}{H_i}$$

With $h_i$ the relative position of the horizon with respect to the highest point of the pillar and $H_i$ the vertical height of the pillar. The proportion of the cell is therefore the average of these four proportions. This example of the method thus simplifies a very complex 3D problem into a much simpler problem.

To calculate $h_i$, the method may calculate the depth of the horizon at the midpoint of the pillar. To calculate the depth of the horizon at any point, a bi-linear interpolation may be used. The calculation is simplified because the method always has four neighbors which, after transformation of the coordinates, define a unit square (see the hyperling https:// en.wikipedia.org/wiki/Bilinear_interpolation, § 1.2.Unit square, at the time of the priority date of the present application).

The method may further comprise smoothing the first stratigraphic layering values before the interpolation and/or extrapolation. Surface (e.g. horizons) may be defined at finer resolutions than grids, such that high frequency variations can make calculations unstable. The smoothing corrects that.

Interpolating first stratigraphic layering values may be performed by linear interpolation or gridding. The method may create an interpolation mask, meaning the collection of all i,j pillars that will be re-interpolated in the following step. The method may do so before cleaning, so as to respect the initial shape and extension of the 2D function. In practice, the method may compute the points cloud envelop in the i,j domain. The mask allows to make an interpolation, but also an extrapolation if needed. In the case extrapolation, the method may comprise defining a limit to the extrapolation (e.g. with an envelope). If the surface has a peripheral cavity, the method may fill said cavity. In such a case, the first region may be the footprint of the surface in top view, and the outline of this footprint may be simplified. The method may make it a bit convex, and for that the method may apply extrapolations (after envelope extraction). Thus, the method may extrapolate beyond the second region, and calculate values for a third region to render the surface more convex.

The method may further interpolate the $k_{Geol}$ in the i,j domain of the reservoir grid using any 2D methods (e.g. gridding) in the predefined mask. Gridding is a widely known and complete algorithm. Gridding minimizes the second derivative of the surface (curvature), which provides a good result. The gridding algorithm itself may manage the interpolation/extrapolation choice.

The algorithm used for interpolation/extrapolation may thus be a gridding, also called "convergent interpolation", which is classical in geosciences. This is a multi-resolution method that handles both interpolation and extrapolation. This is algorithm is now discussed, with reference to its implementation in Petrel 2016.3 (registered trademark).

Convergent interpolation is a control point orientated algorithm (rather than grid point) which will converge upon the solution iteratively adding more and more resolution with each iteration. This means that general trends are retained in areas with little data while detail is honored in areas where the data exists.

Convergent interpolation is the surface gridding and smoothing algorithm used when building a structural model, creating a single surface model or smoothing a grid. It is a general-purpose algorithm suited to a variety of data types of various densities, some of which are: 3D seismic, 2D seismic, well markers and contour data. It is generalized to handle line-type data (e.g., fault interpretations), dense point data (horizon interpretation grids), sparse point data (horizon marker interpretations), or combinations of these and other data types. It uses methods to honor data approximately (geophysical data) or exactly (geologic data). It uses a fast algorithm which builds the model in stages by iterating or converging from an initial to a final solution. There is no data searching or sorting, as is done in traditional methods, which is key to its performance. The iterative converging process makes it data-driven and requires minimal parameter control, although many parameters are available depending on the human interface. Surface derivatives at each iteration are interpolated and fed into the next iteration. Extrapolation is stable, even at large distances from the data.

Each iteration of convergent interpolation is broken into three (3) separate, sequential steps:

1. Refine—Change grid resolution.
2. Snap—Grid (or regrid) the data.
3. Smooth—Minimize grid curvature using a constrained, biharmonic operator.

Figure 10:
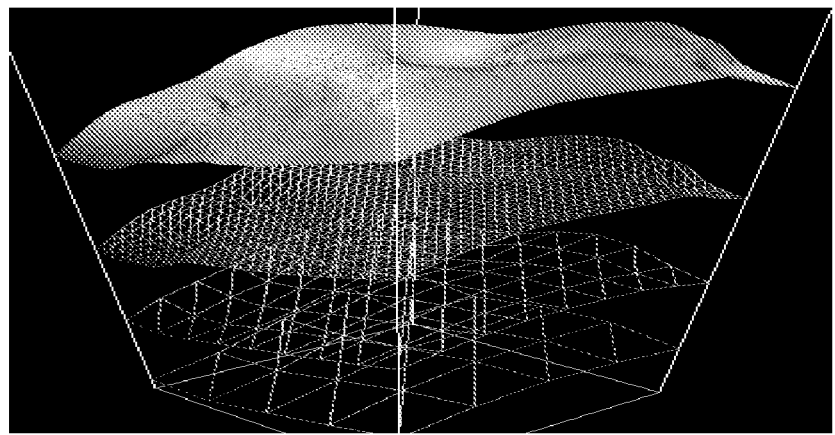

FIG. 10 shows an example of how a model is built up this way, exposing results of internal iterations. The top surface is the final solution and shows input data as points. Notice the extrapolation characteristics and how its gradient favors the implied data gradient near the data's edge. The bottom surface is the initial iteration, which is fitted to the data points. Four (4) iterations were performed to build this model, each at a different grid interval. The interval of each iteration is shown as the grid lattice graphic for all but the last (final) iteration. Starting with an initial coarse grid, a factor resolution change of 2 is applied between iterations. Between the last and next to last iterations, an exact factor is applied to achieve the final grid resolution.

The method may further comprise, for one or more cells of the pseudo-stratigraphic grid (e.g. all cells of the first and second pillars), determining the position of the cell relative to the surface. Such determination is performed based on a comparison of the respective stratigraphic layering index of the cell with the respective first stratigraphic layering value determined for the pillar of the cell if it is a first pillar, or with the respective second stratigraphic layering value determined for the pillar of the cell if it is a second pillar. In such a case, the painting allows to determine how a surface divides cells of the grid.

In such a case, the method may further comprise constructing at least one geological unit based on the determined position of the one or more cells relative to the surface. For example the painted surface may divide an existing geological unit in two subunits, and the method may comprise replacing said existing geological unit by the subunits in the model of the reservoir.

Thus, the painting method allows to integrate in a grid a stratigraphic surface that was not used when creating the grid, for example to cut more finely an existing unit. The representation of a surface intersecting the stratigraphy in a grid is not easy if the latter is complex. The painting method solves these geometric difficulties by considering the surface as a function in the stratigraphic domain, $z=f(i,j,k_{Geological})$. The painting method allows to integrate a new surface into a grid while avoiding the ambiguities of purely geometric methods.

Prior to the painting method, there were two possibilities to integrate intermediate surfaces in a grid. The first possibility was to do it at the construction of the grid. This poses several problems. On the one hand, it is not possible to integrate all stratigraphic surfaces for grid quality reasons. On the other hand, these intermediate surfaces are sometimes not available at the time of creation of the grid. The second possibility was to add the surface a posteriori using purely geometric methods. In the case of complex grids (especially staircase faults), these algorithms fail to resolve all the ambiguities and the final result is not satisfactory.

The painting method proposes to consider that the surface to be introduced into the grid is a function of the parameters $(i,j,k_{Geol})$ of the grid. The surface initially defined in coordinates (X,Y,Z) is transferred geometrically into the grid to be transformed into coordinates $(i,j,k_{Geol})$ and ambiguities are handled in this domain. Once this function is known, the method may determine, for all the cells of the grid, whether they are above or below this surface.

The surface is considered as a function in the domain of the grid, which facilitates its interpolation. The algorithm is fast and robust and solves degenerate cases much more effectively than purely geometric methods. The painting method may integrate any surface into an existing grid without having to recalculate the grid. Coupled with the creation of the geological k, the painting method also makes it possible to use this surface in the rest of the geomodelisation workflow.

The layering method is now discussed in more details.

In the layering method, the pseudo-stratigraphic grid represents geological units. For example, the provided data comprise data associating portions of the grid to geological units, for example cell-to-unit association. As known, each geological unit comprises a respective top and a respective base, which are surfaces delimiting vertically the unit. Each geological unit also has a respective stratigraphic style (i.e. a manner defining how the stratigraphy is arranged in terms of layering, e.g. represented in any manner in the provided data). Such geological units may be defined via the painting method, and/or via geological analysis e.g. based on seismic data.

The layering method comprises performing a local layering scheme for at least one geological unit. The at least one geological unit may be a unit not included in the grid. By "included in the grid", it is meant that the grid is associated to data delimiting the geological unit, as explained above. The at least one geological unit may be one for which such data is not present.

The local layering scheme comprises computing a top 2D map top(.) representing the respective top and a base 2D map base(.) representing the respective base. The 2D maps are merely 2D functions associating to a 2D parameter domain, such as i,j,a respective 3D image (e.g. in the z domain or in the $k_{geol}$ domain).

The local layering scheme comprises defining a gridding constraint depending on the respective stratigraphic style. The gridding constraint is any data that indicates how to perform a gridding, and the local layering scheme uses a constraint that is a function of the respective stratigraphic style (so that the gridding is performed according to the respective stratigraphic style).

The local layering scheme further comprises, for each cell of the respective portion, calculating a respective local stratigraphic layering index $dk^*_{Geol}$ based on the top 2D map, on the base 2D map, on the gridding constraint and on the respective stratigraphic style. The respective local stratigraphic layering index $dk^*_{Geol}$ is an integer. The method may comprise computing a non-integer value, and rounding the value to an integer (such a non-integer calculation followed by a rounding is notably performed in the later-discussed examples).

In the prior art, the stratigraphic layering index is defined for each cell once and for all at the time of constructing the grid. The layering method allows to define a new geological unit or subunit (not relied upon when constructing the grid), and to compute a new value for the stratigraphic layering index that replaces the old value.

Invention:

Examples of the layering method are now discussed.

The at least one geological unit may comprise several geological units that form the reservoir. In other words, the local layering scheme may be performed for several distinct (e.g. and non-overlapping) units. The method may further comprise determining, for each cell of the pseudo-stratigraphic grid, a respective global stratigraphic layering index based on the respective local stratigraphic layering index and on a global recombination scheme. This allows obtaining stratigraphic layering indices globally consistent across units.

The global recombination scheme is any scheme based on information indicating stratigraphy between the several units, and that transforms the local indices into global indices in a manner consistent with the stratigraphy between the several units and with the stratigraphy within each unit (provided by the local indices). By "local" indices, it is merely meant the indices outputted by the method based solely on the top 2D map, on the base 2D map, on the gridding constraint and on the respective stratigraphic style, and thus before any global recombination scheme. By "global" indices, it is merely meant the transforms thereof determined by the global recombination scheme.

In examples, the layering method may be performed with a grid already provided with stratigraphic layering indices. Thus, the method may comprise providing, for each cell of the respective portion, a respective initial stratigraphic layering index $k_{Geol}$. By "initial", it is merely meant "already associated to the grid". In such a case, the method may comprise replacing the respective initial stratigraphic layering index. The replacement indices may be the local indices or the global indices (if any), depending on the situation.

In examples, the top (resp. base) has a first region and a second region complementary to the first region. The top (resp. base) 2D map outputs, for each cell of the top (resp. base), a respective local stratigraphic value. In such a case, the computing of the top (resp. base) 2D map includes, for each first cell of the first region, determining a respective first stratigraphic layering index $k^*_{Geol}(i,j)$ based on the respective initial stratigraphic layering index, and, for each second pillar i,j intercepted by the second region, determining a respective second stratigraphic layering value $k^*_{Geol}(i,j)$ by interpolating first stratigraphic layering values. The layering method here performs an interpolation in the manner of the painting method, to improve robustness and accuracy at regions of the top (resp. base) for which the values of the 2D map are unreliable.

The interpolation may be performed as described with respect to the painting method. Unlike the painting method, the layering method may limit such correction to interpolations, that is, with no extrapolation at all (e.g. and thus no abovementioned "third" region). Furthermore, the interpolation may be performed without user-intervention, and be limited to the earlier-mentioned core region.

In case of the presence of initial stratigraphic layering indices, the first stratigraphic layering indices may be said initial stratigraphic layering indices. In case no stratigraphic layering index is available at all, the first stratigraphic layering indices may be the gridding indices.

Figure 11:
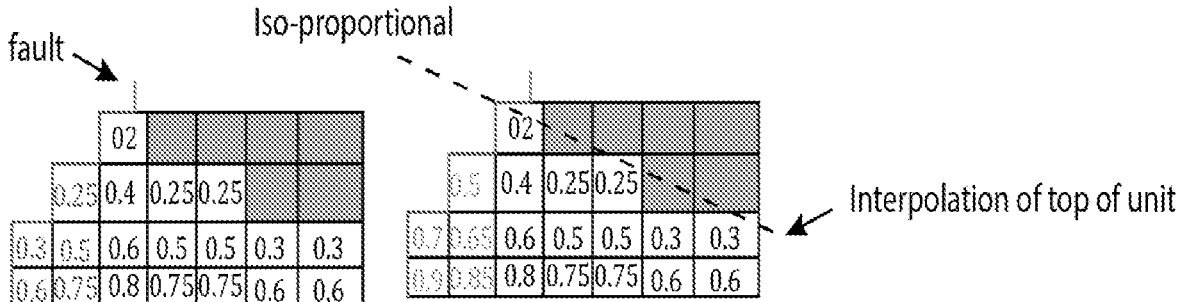
Figure 12:
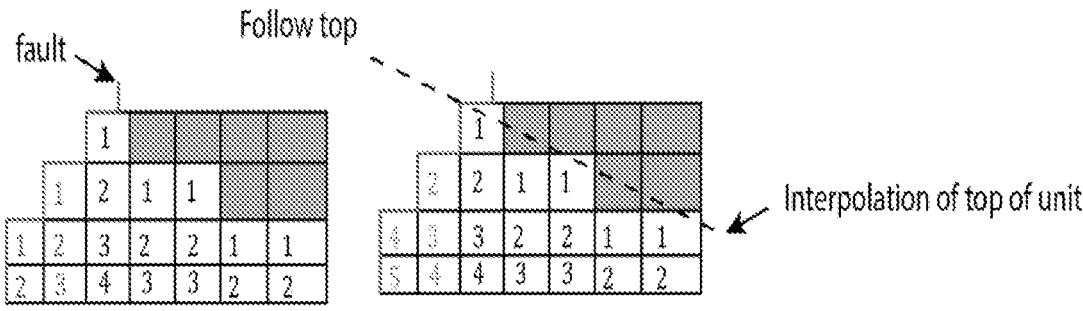

FIGS. 11-12 show examples of two anomalous cases and how such interpolation can correct them. It is considered that the method is applied for determining a new layering in the non-colored geological unit, of which top is not of constant depth and layer number, and is bordered by a fault on its side.

In the case of FIG. 11, the method may for example consider an iso-proportional layering. The figure shows example values for dt (see later). On the leftmost sub-figure, using directly the top of the unit, the result is not correct under the fault. Indeed, without the interpolation, the algorithm considers that the fault is the top of the unit. On the rightmost sub-figure, the method re-interpolates the top of the unit and calculates the dt with respect to this interpolated top. The result is correct.

In the case of FIG. 11, the method may for example consider a follow-top layering. The figure shows the schematic $dk^*_{Geol}$. On the leftmost sub-figure, using directly the top of the unit, the result is not correct under the fault. Indeed, without the interpolation, the algorithm considers that the fault is the top of the unit. On the rightmost sub-figure, the method re-interpolates the top of the unit and calculate the dt with respect to this interpolated top. The result is correct.

In general and similarly to the painting method, the second region may be present a discontinuity. The reservoir may for example comprising a geological structure which intersects the surface and yields the discontinuity. For example, the geological structure is a fault or an unconformity.

In examples, the method may comprise detecting such faulted cells of the top (resp. base) based on topology of the pseudo-stratigraphic grid.

Figures 13, 14:
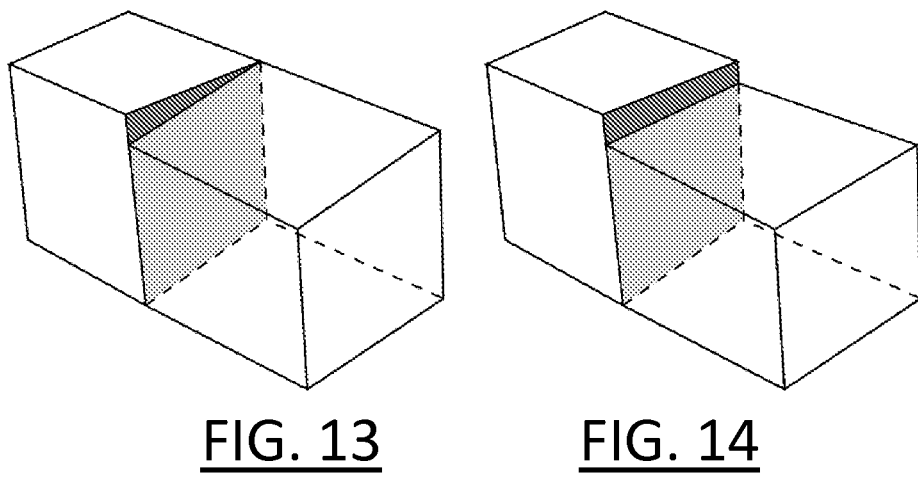

FIGS. 13-14 show two configurations among others presenting a lateral disconnection between two cells. Note that only one non-shared point is enough to create a disconnect.

In the case of the interpolation, the respective stratigraphic style may be a true iso-proportional style. Indeed, this case is related to the number of cells in a pillar and so yielding a number of precise layers (the same everywhere) is of particular importance. Also, the computations may require (as discussed later) both the top and bottom. In such a case, the method may use $k_{geol}$ (while it may use z in other cases as it may be sufficient). Using $k_{geol}$ in the a true iso-proportional style case leads to accuracy. In other styles, using z is sufficient, so there may be no need for a $k_{geol}$ and its interpolation.

In examples, the top 2D map and/or the base 2D map each output, for each pillar i,j intercepting the at least one geological unit, a respective value top(i,j) or base(i,j) of a vertical positioning measure, which may be $k_{Geol}(.)$, or the value z(.) (e.g.

in which case the value for the cell barycenter may be used). In such examples, the calculating may include establishing a respective pseudo relative depositional time dt, based on a comparison between a respective value of the vertical positioning measure at the cell and the respective value outputted by the first and/or base 2D map. The calculating may further include converting the respective pseudo relative depositional time into the respective local stratigraphic layering index based on the gridding constraint and/or a comparison between the top 2D map and the base 2D map. The establishing and the converting may be performed further based on the respective stratigraphic style. This provides efficiency to the method.

Further, in such examples, when the respective stratigraphic style is a true iso-proportional style or an iso-proportional with geometrical option style (the "geometric style" referring to the fact that the effective width in meters is used, whereas in the "true style" the value of the true kgeol is used), the gridding constraint may be a target number of cells, and the converting may include multiplying the target number of cells with the respective pseudo relative depositional time. When the respective stratigraphic style is a follow-top style or a follow-base style, the gridding constraint may be a target cell thickness, and the converting may include multiplying a max of the difference between the top 2D map and the base 2D map with the respective pseudo relative depositional time, divided by the target cell thickness. This leads efficiently to accurate results.

The following discusses examples of establishing a respective pseudo relative depositional time based on the respective stratigraphic style.

Iso-Proportional

For a given cell in the unit, the local pseudo-time dt may be calculated by linear interpolation between the top and the base of the unit:

$$dt = \frac{z(i, j, k_{Grid}) - base(i, j)}{top(i, j) - base(i, j)} \in [0, 1]$$

For example, dt is 1 on the top, 0 on the base and 0.5 in the middle. The repository chosen may be the initial layering or the true depth. This choice of repository may be left to the user according to the following choices:

A true iso-proportional layering is calculated in the depth space because one wants to have a thickness linearly distributed But this reasoning has its limits when the grid is complex (especially at the level of faults where a reasoning in z is no longer valid because of discontinuities) and it is better in this case to work in the initial layering. The method may be less precise because it may cut the grid with respect to a number of cells. So, if the cells do not have the same thickness, the new layering is not be perfectly iso-proportional. But since the method here works in layering and interpolation is conducted around discontinuities, the result is be much more consistent overall.

To transform this local pseudo-time into layering, simply multiply it by the desired number of layers in the unit and round it up:

$$dk^*_{Geol} = dt \times n \in [|0, n-1|[$$

Follow-Top/Follow-Base

In these styles, the vertical thickness of the cells is fixed, but because the thickness of the unit varies horizontally, the number of cells is not known and varies in space. Since it is the thickness that is fixed, the method may work in the depth domain rather than in the field of initial layering.

So there is an initial step in which the method may calculate the maximum thickness of the unit, which eventually gives the maximum number of cells that can be along a pillar. It is a question of going through the pillars and calculating the thickness and keeping the largest:

$$t_{max} = max(z_{base}(i,j) - z_{top}(i,j)) \ \forall (i,j)$$

The maximum number of layers that the method may can have along a pillar will therefore be:

$$n = min\left(1, \frac{t_{max}}{t}\right)$$

Where t is the target cell thickness entered by the user.

22

Follow Top

By definition, the local pseudo-time is defined as:

$$dt = \frac{z(i, j, k_{Grid}) - z_{top}(i, j)}{t_{max}} \in [0, 1]$$

For example, dt is 0 at the top of the horizon and is 1 at the base where the unit is the thickest.

To convert dt to a layer index, the method may use the following formula:

$$dk^*_{Geol} = dt \times n \in [|0, n-1|[$$

Follow Base

By definition, the local pseudo-time is defined as:

$$dt = \frac{z_{base}(i, j) - z(i, j, k_{Grid})}{t_{max}} \in [0, 1]$$

For example, dt is 0 at the base of the horizon and is 1 at the top where the unit is the thickest.

$$dk^*_{Geol} = dt \times n \in [|0, n-1|[$$

The layering method thus allows to generate a geological layering property directly in the reservoir grid, respecting stratigraphic constraints within units. The calculation of the geological k is done directly in the reservoir grid respecting stratigraphic constraints within units (which may be conformal, erosive or deposited on a paleotopography). The filling can then be done using this geological k instead of using the k of the grid as is conventionally done. This avoids grid distortion problems and simplifies the construction of the grid. The calculation of this property is done directly in a "sugar box" grid using stratigraphic constraints. The resulting grid is directly usable for geostatistical and dynamic simulations, without cell distortion, while maintaining a correct definition of the stratigraphy. The creation of this property does not require complex structural modeling and the creation of a grid consistent with the stratigraphy. It is made directly in a simple grid. The simulation methods may then use this stratigraphic property in place of the grid layering.

Example implementations of the painting and layering methods are now discussed.

Definitions

Indices are integer numbers that start at 0.

Horizons are defined as regular grids in the (x,y) domain, defined in time or depth.

Reservoir grids are non-regular structured 3D grids made by hexahedral cells.

These cells are localized in the reservoir grid with three indices (i,j, $k_{Grid}$), i and j being horizontal and defining so-called pillars and $k_{Grid}$ being the vertical axis increasing downwards.

The six vertices of each cell are expressed as 3D coordinates in the (x,y,z) space, z being in time or depth and increasing downwards by convention. Neighbor cells in the grid can be connected or disconnected, depending on if they are sharing some vertices on the facing facet. Connections and disconnections correspond to the grid topology. One non-connected vertex beween 2 neighbor cells is enough to create a disconnection, even partial.

The stratigraphy represents the way sediments were deposited. The grid is divided in stratigraphic units, defining stratigraphically consistent zones. In each unit, a layering represents the stratigraphy.

This information can be carried by the grid itself or by a property that gives for each cell an index corresponding to the stratigraphic layer. For the sake of generality, the layering is noted thereafter $k_{Geol}$.

All cells with the same layering value belong to the same stratigraphic layer, meaning that they were deposited at the same geological time. Having a reliable stratigraphy is key as it is one of the main drivers of reservoir heterogeneities (e.g. facies, lithology, petro-physical parameters, and/or fluid flow).

Figure 15:
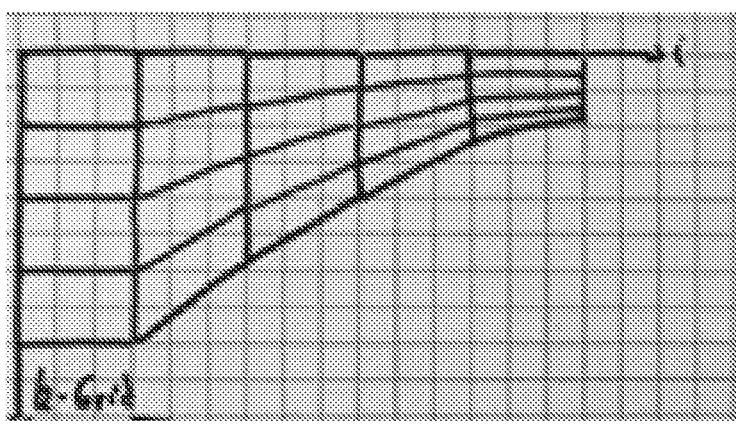
Figure 16:
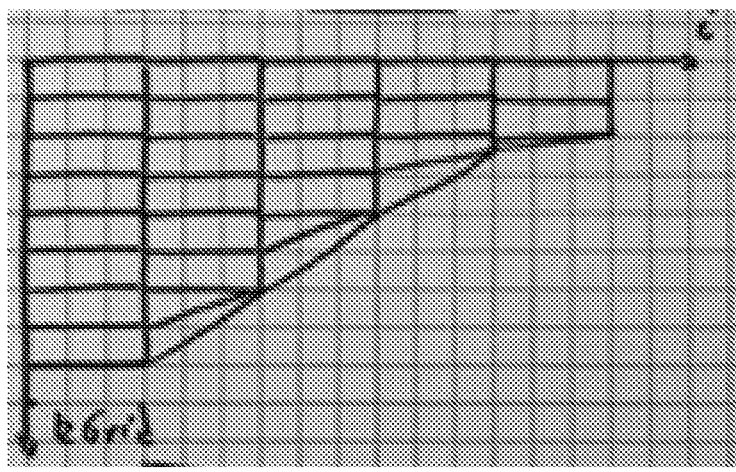
Figure 17:
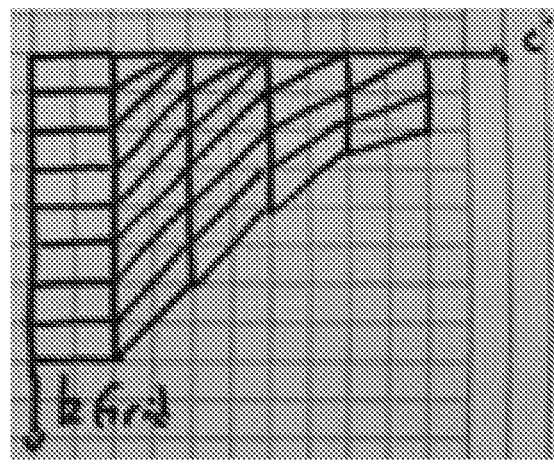

Referring to FIGS. 15-17, three main stratigraphic style can be defined depending on the geological settings:

Iso-proportional, to represent conformable geology (FIG. 15),

Follow-top, to represent passive filling of a depression against an older high (FIG. 16), and Follow-base, to represent the erosion (cutting) of a unit by a younger unit (FIG. 17).

Generalization

In the following, horizons could be defined by any other mathematical representations as long they are mono-valued with respect to the initial $k_{Geol}$ of the reservoir grid.

In the following, reservoir grids could be unstructured as long they are provided with an initial stratigraphic topology.

The example implementation of the painting method is now discussed in the case of horizon painting.

Objective Paint a horizon in a reservoir grid without artefacts, e.f. flag each cell as "above" or "below" the horizon in a stratigraphic sense.

Issue Artefacts could appear in case of complex grids (e.g. faults, and/or erosion).

Solution Create an implicit representation of the horizon as $f(i, j)=k_{Geol}$.

Usage Add a new stratigraphic horizon in any reservoir grid to define new stratigraphic unit(s).

1. For a given horizon the method may compute a 2D function that gives for each (i,j) pillar the relative position of the horizon in the $k_{Geol}$ domain of the reservoir grid. These values can be undefined if the horizon is completely above or completely below the reservoir grid at some pillars. The relative position is computed by averaging the proportion of each cell pillar above the horizon. Horizon values are interpolated using a Lagrangian estimation (as explained earlier). Any other methods may be used (for proportion computation and horizon interpolation).

2. This function may be smoothed, using median filtering or moving average or any other 2D filters.

3. This function is known to be incorrect in some areas, typically close to faults, or erosions. Therefore, it may be cleaned and re-interpolated:

a. The method may create an interpolation mask, meaning the collection of all (i,j) pillars that will be re-interpolated in the following step. The method may do it before cleaning to respect the initial shape and extension of the 2D function. In practice, the method may compute the points cloud envelop in the (i,j) domain.

b. The method may clean the function by erasing its values in a region provided by the user. It could be manually defined or automatically defined using distance-based filters.

c. The method may interpolate the $k_{Geol}$ in the (i,j) domain of the reservoir grid using any 2D methods (e.g. gridding) in the predefined mask.

4. We now have a 2D function that represents implicitly the initial horizon in the reservoir grid, named $k^*_{Geol}$. Due to the interpolation process, this function takes its values in R.

5. The method may now determine for each cell of the reservoir grid if it lies above or below the horizon.

The method may compare the $k_{Geol}$ of each cell (i,j, $k_{Grid}$) with the corresponding $k^*_{Geol}$ at the same (i,j) pillar. The cell is above the horizon if $k_{Geol}(i,j,k_{Grid}) < k^*_{Geol}(i,j)$, and below otherwise.

For instance if $k^*_{Geol}$ is 4.75 at a given (i,j) position, cells along this (i,j) pillar with $k_{Geol}$ ranging from 0 to 4 will be flagged "above", others will be flagged "below".

The example implementation may thus consist of a method of integrating a new horizon into a pseudo-stratigraphic reservoir grid. The method may include the following steps:

a) Provide a non-stratigraphic reservoir grid, b) Identify possible anomalous zones (e.g. faults, bevel regions, and/or discrepancies) using filters (e.g. distance to faults, and/or rough horizon painting)

c) Identify the cells intersected by the surface to be added to obtain a function $f(i,j)=k_{geol}$ (2D function).

d) Delete the values of the function f in the zones identified in step b).

e) Interpolate the missing f values thanks to the values on both sides of the missing zones to obtain a continuous map $f(i,j)=k_{geol}$.

f) Determine the cells of the grid above and below the added horizon with the property $f(i,j)=k_{geol}$ to obtain an implicit representation of the added horizon.

The method ultimately allows to obtain new geological units.

The example implementation of the layering method is now discussed.

Objective Compute the stratigraphic position of a cell in a unit.

Issue In case of faults, the true top and base of the unit are not known.

Solution Reconstruct the top and base of the unit in the stratigraphic domain.

Usage Create a new $k_{Geol}$ property in a unit where the previous stratigraphy is not satisfactory.

1. The computation of a new $k^*_{Geol}$ layering is done per unit, based on an initial $k_{Geol}$ and a target stratigraphic style.

a. The output is a local $dk^*_{Geol}$, valid only within the unit.

b. Then, the method may recombine all the "local" $dk^*_{Geol}$, so that the new layering is consistent between the units, meaning no voids nor intersections.

The first layer starts at 1 and in each following units the layering is shifted so that it starts at 1+last value on the layering in the previous unit. In practice, this is done on the fly by incrementing the layering from a unit to another.

2.1. For a true iso-proportional unit:

a. Input: the target number of cells n in the unit b. The method may compute the 2D maps representing its top and its base in the stratigraphic domain. Each map is in the form $f(i, j)=k_{Geol}$.

i. The method may extract raw top and base maps. This extraction is performed on each pillar. For the top, the method may retrieve the minimum $k_{Geol}$ in the unit ignoring faulted cells. For the base, the method may do the same thing looking for the maximum $k_{Geol}$. To detect faulted cells, the method may use the topology of the grid.

ii. The method may interpolate top and base maps using 2D linear interpolation to fill the void due to faults.

c. Then, for each cell at (i,j), the method may compute a "pseudo relative depositional time":

$$dt = \frac{k_{Geol}(i, j, k_{Grid}) - \text{base}(i, j)}{\text{top}(i, j) - \text{base}(i, j)} \in [0, 1]$$

d. The method may convert this dt into a local layering $$dk^*_{Geol} = dt \times n \in [|0, n-1|[$$

2.2. For a iso-proportional unit with geometrical option:

a. Input: the target number of cells n in the unit b. The method may compute the 2D maps representing its top and its base in the z domain. Each map is in the form f (i, j)=z.

i. The method may extract top and base maps. This extraction is performed on each pillar. For the top, the method may retrieve the z value of the cell with the minimum $k_{Geol}$ in the unit, whatever its topology. For the base, the method may do the same thing looking for the z value of the cell with the maximum $k_{Geol}$.

ii. No post processing.

c. Then, for each cell at (i,j), we compute a "pseudo relative depositional time"

$$dt = \frac{z(i, j, k_{Grid}) - \text{base}(i, j)}{\text{top}(i, j) - \text{base}(i, j)} \in [0, 1]$$

d. The method may convert this dt into a local layering $$dk^*_{Geol} = dt \times n \in [|0, n-1|[$$

2.3. For a follow-top unit:

a. Input: the target cell thickness t b. The method may compute the 2D maps representing its top and its base in the z domain. Each map is in the form f (i, j)=z.

i. The method may extract top and base maps. This extraction is performed on each pillar. For the top, the method may retrieve the z value of the cell with the minimum $k_{Geol}$ in the unit, whatever its topology. For the base, the method may do the same thing looking for the z value of the cell with the maximum $k_{Geol}$.

ii. No post processing.

c. The method may compute the maximum thickness using top and base maps:

$$t_{max} = \max(\text{base}(i,j) - \text{top}(i,j)) \forall (i,j)$$

d. Then, for each cell at (i,j), the method may compute a "pseudo relative depositional time":

$$dt = z(i,j,k_{Grid}) - \text{top}(i,j) > 0$$

e. The method may convert this dt into a local layering:

$$dk^*_{Geol} = dt \times \frac{t_{max}}{t} \in [|0, n-1|[$$

2.4. For a follow-base unit:

a. Input: the target cell thickness t b. The method may compute the 2D maps representing its top and its base in the z domain. Each map is in the form f (i, j)=z.

i. The method may extract top and base maps. This extraction is performed on each pillar. For the top, the method may retrieve the z value of the cell with the minimum $k_{Geol}$ in the unit, whatever its topology. For the base, the method may do the same thing looking for the z value of the cell with the maximum $k_{Geol}$.

ii. No post processing.

c. The method may compute the maximum thickness using top and base maps $$t_{max} = \max(\text{base}(i,j) - \text{top}(i,j)) \forall (i,j)$$

d. Then, for each cell at (i,j), the method may compute a "pseudo relative depositional time"

$$dt = \text{base}(,j) - z(i,j,k_{Grid}) > 0$$

e. The method may convert this dt into a local layering $$dk^*_{Geol} = dt \times \frac{t_{max}}{t} \in [|0, n-1|[$$

The example implementation may thus consist of a layering method in a pseudo-stratigraphic reservoir grid. The method may include the following steps:

a) Provide a non-stratigraphic reservoir grid including geological units and initial layering ($k^i_{geol}$), b) For each geological unit, 1. define a target stratigraphy including geometric parameters of size or cell number (e.g. isoproportional, follow top, follow base . . . )

2. For each $k^i_{geol}$ map at the top and at the base of the unit ($k^{top}_{geol}$ and $k^{base}_{geol}$), i. identify the possibly anomalous zones (faults, bevel regions, discrepancies . . . ) using a topology analysis (in a hexahedral grid, if a cell has less than 6 neighbors then there is an anomaly) (similar to step b) of the painting method)

ii. Remove $k^i_{geol}$ values at the top and at the base of the unit for anomalous cells (similar to step b) of the painting method)

iii. For anomalous cells, interpolate the $k^i_{geol}$ values at the top and at the base of the unit thanks to the $k^i_{geol}$ values on either side of the missing zones (similar to step b) of the painting method)

3. For each pillar of the geological unit, i. calculate the $k^{top}_{geol} - k^{base}_{geol}$ difference to obtain the initial cell number of the unit in each pillar No ii. calculate the $k^{local}_{geol}$ value taking into account the initial cell number of the unit in each No pillar, the cell number (or size) of the target stratigraphy, and the initial $k^{local}_{geol}$ of each cell in the initial layering c) For each pillar of the grid, calculate the sum of $k^{local}_{geol}$ of all geological units from top to bottom to obtain the new layering in the form of a $k^{global}_{geol}$ cube for the whole grid The example implementation ultimately allows a layering that avoids problems of grid distortion which simplifies the construction of the grid.

An example application of the methods is now discussed with reference to FIGS. 18-27, where the painting method is specifically referred to as "Smart horizon painting" and the layering method is referred to as "Create geological layering".

Figure 18:
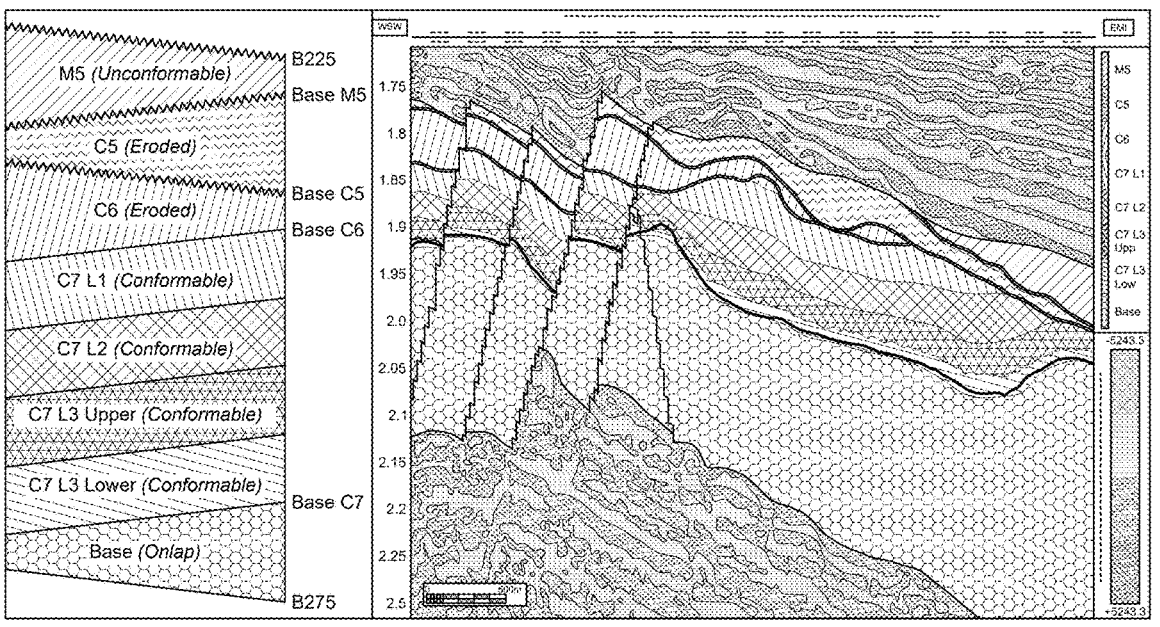

Referring to FIG. 18, the example application was based on handling a pseudo-stratigraphic approach. It was decided for flow simulation accuracy to limit as much as possible the pinches between the units, thus to use only the top and base of the reservoirs (B225 and B275) to build the grid. Intermediate interpretations, bounding erosive subunits inside the reservoir, were not used directly for the grid generation but only afterwards, in a pseudo-sugar box approach. Also, some of the unit boundaries were not interpreted on the seismic, but were defined inside a unit using proportional layers (C7-L1 to L3).

This approach required to paint the units into the grid, to compute a geological layering inside the painted units, in order to get a stratigraphic continuity of the layering to perform geostatistics simulations. This new layering is also required to subdivide unit C7.

FIG. 18 shows the stratigraphy of a hydrocarbon field. B225 and B275 are the two horizons used for building the reservoir grid; M5 base is a regional erosive surface, C5 base is a locally erosive surface. C6 and C7 are conformable units that are eroded by both C5 and M5.

Unit painting in the grid

Direct Painting

Intermediate horizons were painted into the grid to define the units; this painting consists in detecting the cells that are "above" and "below" the horizons.

Figure 19:
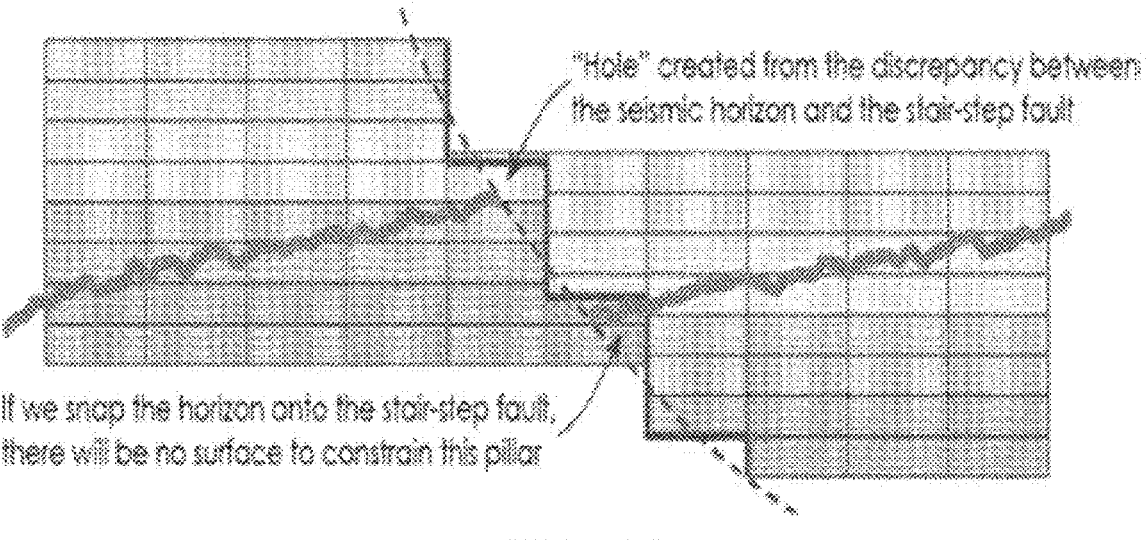

Referring to FIG. 19, the classical approach, which performs a vertical projection of the raw horizon surface, generates holes in the vicinity of faults. Holes are related both to small discrepancy between input horizon surface—often interpreted on the seismic and therefore controlled by seismic faults—and stair-step faults, but also to missing cells along stair-step faults.

FIG. 19 shows such direct horizon painting. Geometric ambiguities appear when painting a faulted horizon near a stair-step fault.

Figure 20:
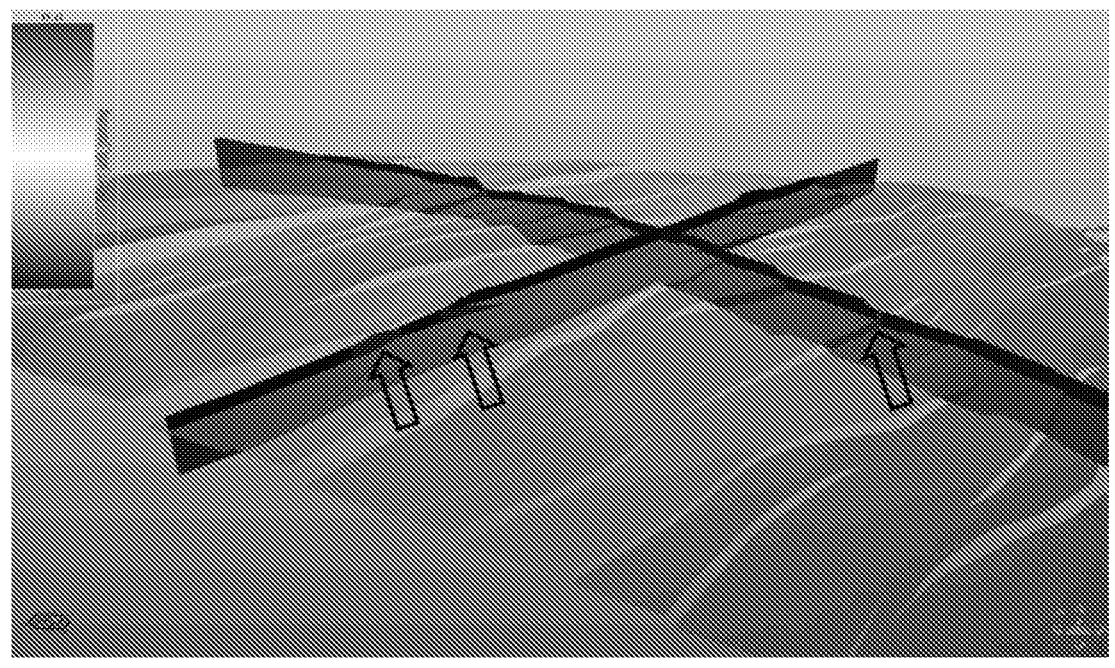

FIG. 20 further shows direct painting of the horizons in the grid using a horizon filter module. The resulting property is affected by holes (arrows). These artifacts can affect a large part of the grid and can be tedious to analyze and QC. To correct this effect, it was proposed to use the painting method in the following way: 1) filter around the faults and 2) re-interpolate the painted property in order to 3) get a properly painted unit property.

Smart Unit Painting

The painting method cleans the painted property using a given filter, and re-interpolates this property in the cleaned area. The interpolation is performed in the stratigraphic domain to ensure valid output unit. All these properties—one per horizon—may be combined to generate units.

Filtering Property Creation

Figure 21:
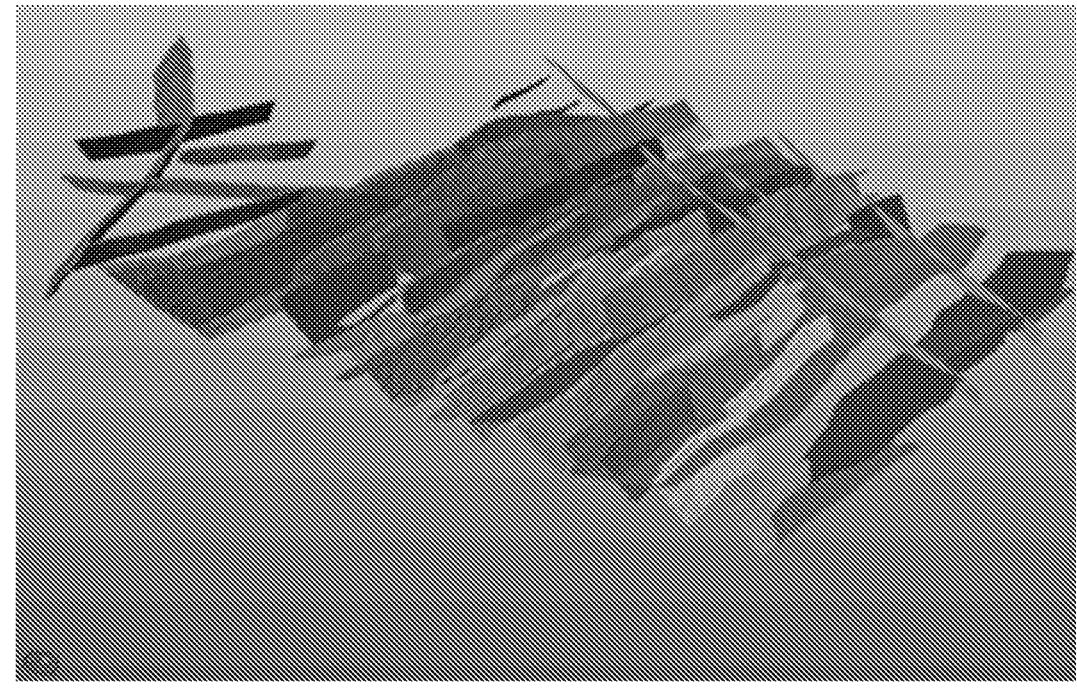
Figure 22:
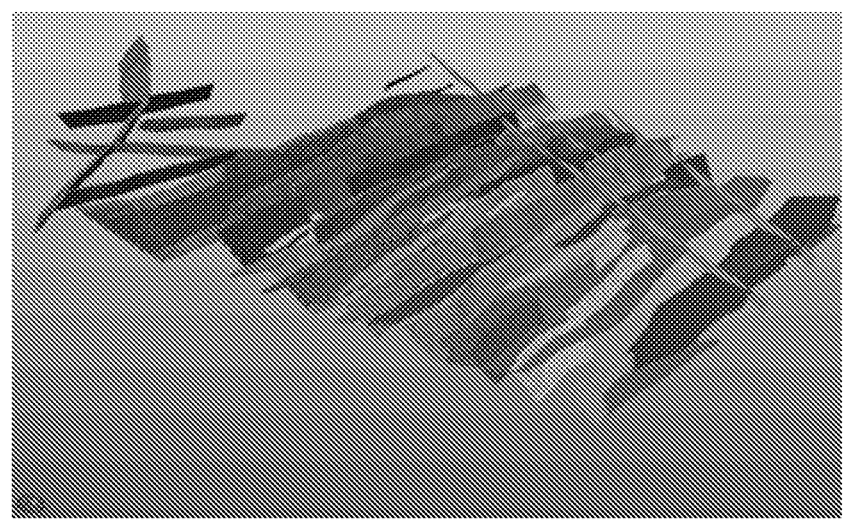

Referring to FIGS. 21-22, the filter can be defined from any condition or combination of conditions. Commonly, the areas that cause issues when painting a horizon into a grid are along the stair step faults. Consequently, the filter may be a cutoff on the distance to faults. For this reason, a fault region is created, collecting all the cells that are intersected by the faults—it is possible to compute directly the distance to the fault surfaces using a multi-condition filter, but it is tedious and not recommended. FIG. 21 shows fault region creation. Faults are selected to build a region in the grid. Resulting region is displayed on the right.

As shown by FIG. 22, the resulting region may then be used as a seed to compute the distance to the faults, in number of cells. It should be noted that because the filtering region is versatile, tailor made conditions can be designed, for instance to adapt the filtering to different fault families. FIG. 22 shows distance to fault computation. A distance to fault property (expressed in number of cells) was thus computed.

Smart Horizon Painting

A Smart horizon painting module can then be applied to compute a property per horizon in the grid; this property equals −1 above the horizon and +1 below (see FIG. 23). Several parameters were available to create the property:

A median filter can be applied as a pre-processing, it is recommended when the horizon is spiky and unfaulted (or with few pseudovertical faults);

Two interpolation methods may be made available to reconstruct the horizon in the filtered region:

Linear interpolation, recommended for horizons extracted from a faulted structural model (clean horizons respecting the stratigraphic relationships between the units), Gridding, which is recommended for roughly interpreted horizons;

Alternatively, the horizon can be extrapolated outside of the initial surface. In this case, the combination of the different properties at the end may turn out to be tricky.

This process may be applied for all the horizons bounding the units; it then generates four properties.

Figure 23:
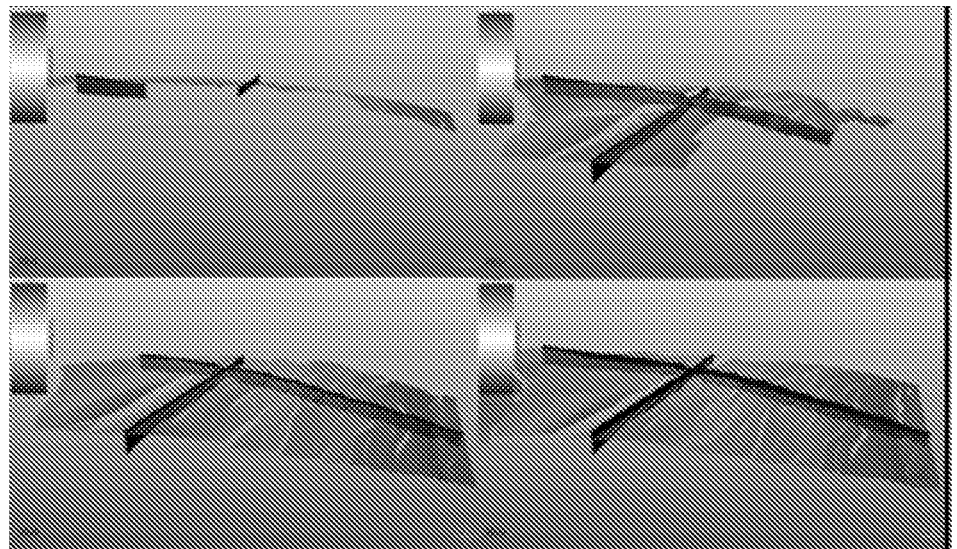

FIG. 23 shows smart horizon painting. Horizons painting using the new dedicated module, with an interpolation of the generated properties. Painting results for of every interpreted horizons M5 base, C5 base, C6 base and C7 base show neither holes nor artifacts.

Unit Combination

Once the horizons are painted into the reservoir grid, another module can be applied to combine the created properties and generate a unit property. This is a series of logical operations based on a given stratigraphic column. The properties corresponding to the horizons are given in a specific order, a unit being defined between two horizons and corresponding to a unique value. By default, the unit property increases from top to bottom and starts at 1, but this can be edited.

Grid Layering vs. Stratigraphy

Grid Layering

The layering of the grid (corresponding to the k index of the cells) was built as an isoproportional layering between the top and the base without accounting for the internal stratigraphy; it has no stratigraphic meaning. It is thus mandatory for property modeling to compute a stratigraphic layering based on the newly created unit property.

Figure 24:
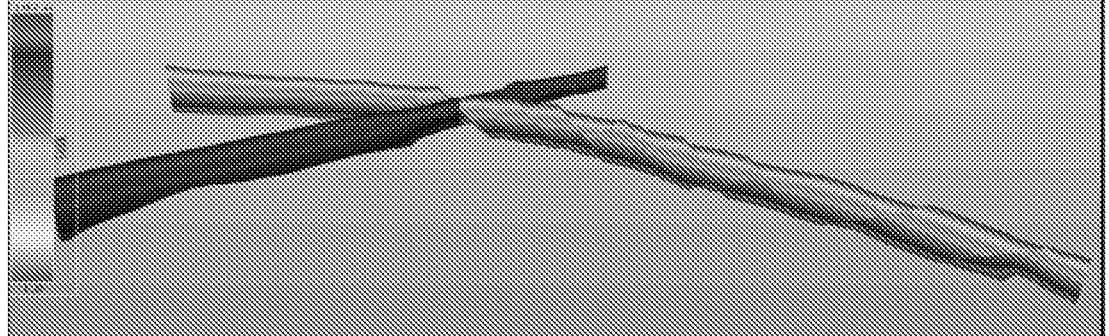

FIG. 24 shows the grid layering generated using an isoproportional layering between B225 and B275, the top and base of the reservoir grid. This layering does not reflect the stratigraphic continuities.

Geological Layering

A new layering was computed using a module "Create geological layering". This module allows, like classical structural modeling, to define the layering in each of the units, associated with a number of cells if isoproportional layering is chosen, and a cell thickness if a follow top or base layering is selected.

Figures 25, 26:
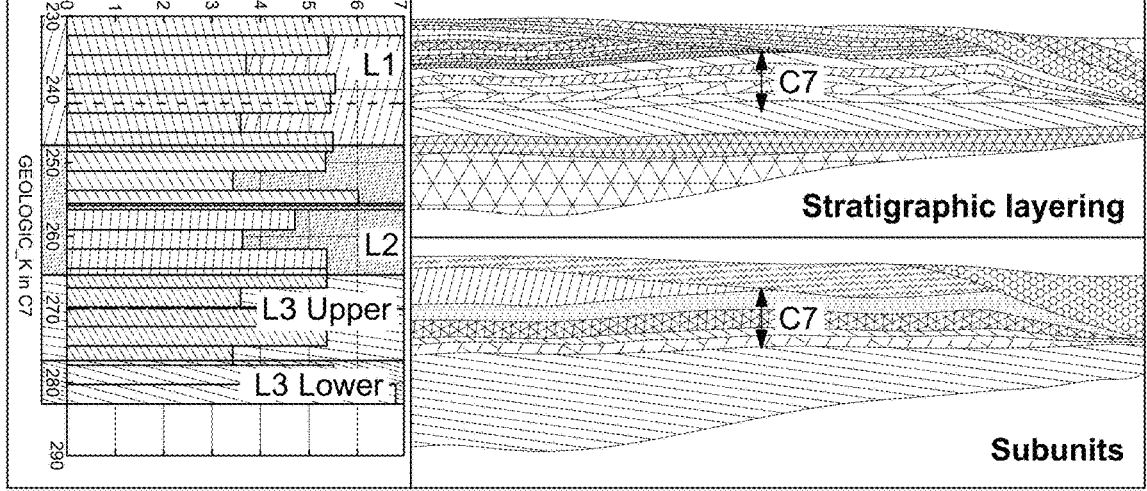

FIG. 25 shows the new layering computation using the module Create geological layering, respecting the stratigraphic relationships of the column.

Subunits Definition

From the stratigraphic layering, subunits can be defined. In our case, unit C7 was equally divided into three subunits C7 L1, L2 and L3, and the last one, L3, was divided into an upper and a lower part, corresponding respectively to ⅓ and ⅔ of C7 L3 thickness (FIG. 26).

This can be done using Create/modify property with a filter on the limiting values of the stratigraphic layering.

FIG. 26 shows subunits definition in C7, using the newly created stratigraphic layering for dividing equally the three layers, and then dividing L3 layer into ⅔ and ⅓ respectively for the upper and lower parts. This is done using a filter on the stratigraphic layering property in Create/Modify property.

Fit Grid to Wells

When adjusting a grid to well markers, mismatches may be propagated in the stratigraphic domain to ensure a consistent adjusted grid. The Fit grid to wells module may account for a geological layering. The subunits that are defined are respected and the reservoir grid can be fitted to associated markers.

Facies and Petrophysical Properties Modeling

As for the fit to wells module, most of the facies and petrophysical properties methods now propose to use a geological layering instead of the grid layering, to ensure a stratigraphic continuity when performing geostatistics. This was used for TGS facies simulations and SGS petrophysical simulations.

In the subunits C7 L1 and C6 North, U-Like method was applied to generate channels.

Visualization and QC

A multi-condition filter allowed working with the units defined by the Smart unit painting, or with the stratigraphic layering. For instance, for a more efficient check of the facies and petrophysical properties simulated using the geological layering, one may use the filter to visualize the results of the simulation in each geological layer, instead of doing this in each grid layer (see FIG. 27). To perform the QC of the grid generation and unit painting, it is possible to compute the residuals using a filter on the unit property. This property can also be used directly to extract top and base horizons of the units. HuPhiSo maps computation modules also offer the possibility to use a multi-condition filter, allowing using the stratigraphic layering instead of the grid layering.

Figure 27:
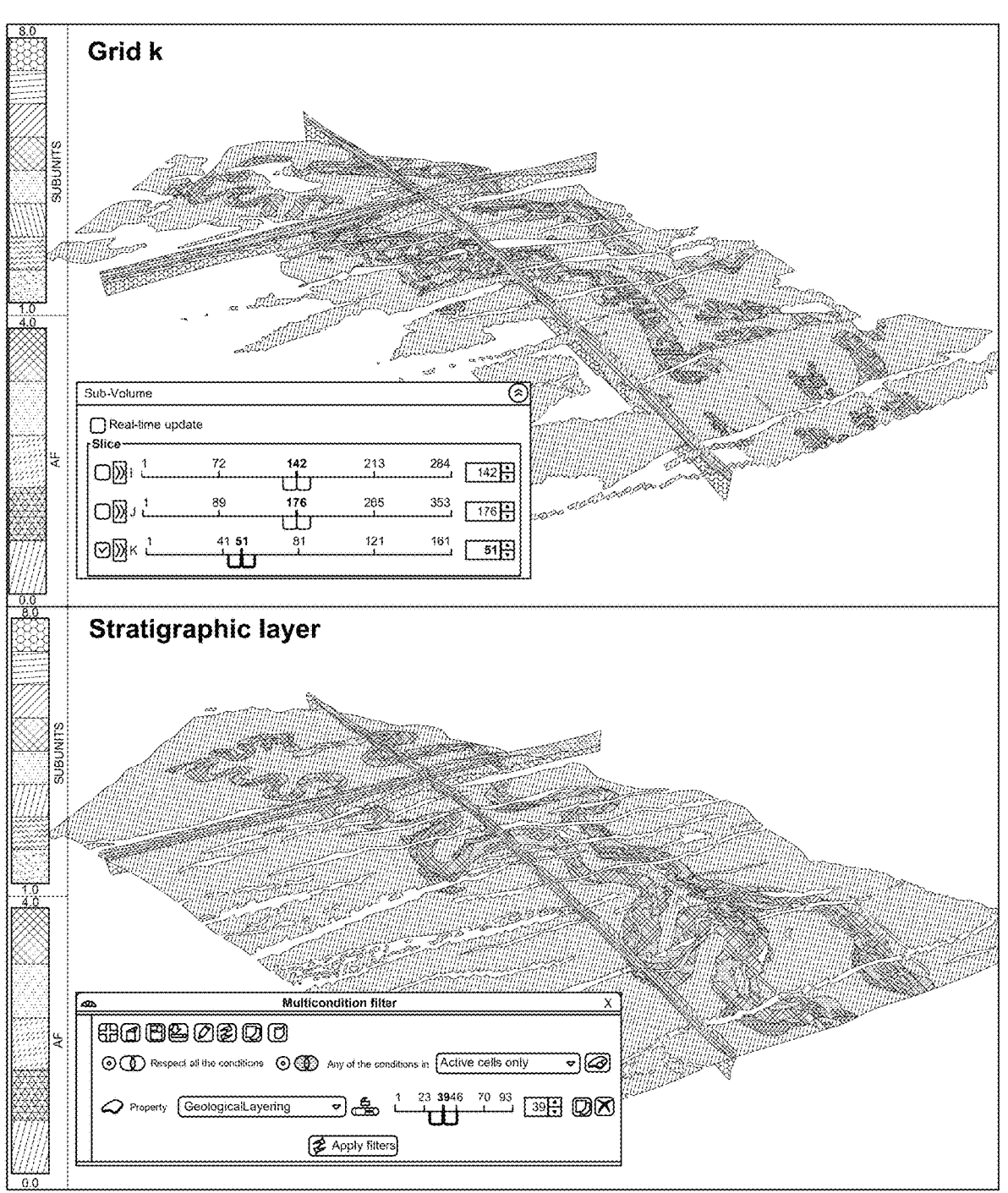

FIG. 27 shows the grid layering visualization vs. Stratigraphic layering visualization. The grid K visualization does not show the stratigraphic continuities as it crosses several units. The stratigraphic layer visualization, applied with a multicondition filter, allows to properly check the geostatistical simulations.

Conclusions of the Example Application

The new workflow allows combining a complex stratigraphy with grid quality constraints needed for dynamic simulations, by dissociating the grid geometry from the true geometry of the reservoir. Grids that follow this principle are named pseudo-stratigraphic because the cell k index is not related anymore to its stratigraphic location.

Several methods have been developed to generate the required properties: smart painting of the horizons, units combination, and new geological layering. These properties can then be used in most geostatistical methods, and can also be properly visualized for QC purpose.

The invention claimed is:

1. A process comprising one or more iterations of a computer-implemented method of geomodeling, the method comprising:

providing a pseudo-stratigraphic grid representing a reservoir having geological units, the pseudo-stratigraphic grid having pillars, each pillar including respective cells, each geological unit being represented by a respective portion of the pseudo-stratigraphic grid and having a respective top, a respective base, and a respective stratigraphic style;

for at least one geological unit:
    computing a top 2D map representing the respective top and a base 2D map representing the respective base;
    defining a gridding constraint depending on the respective stratigraphic style; and
    for each cell of the respective portion, calculating a respective local stratigraphic layering index based on the top 2D map, on the base 2D map, on the gridding constraint and on the respective stratigraphic style;

providing, for each cell of the respective portion, a respective initial stratigraphic layering index; and replacing the respective initial stratigraphic layering index;

wherein:
    at least one of the top and the base has a first region and a second region complementary to the first region,
    at least one of the top and the base 2D map outputs, for each cell of at least one of the top and the base, a respective local stratigraphic value, base, and
    the computing of at least one of the top and the base 2D map includes:
        for each first cell of the first region, determining a respective first stratigraphic layering index based on the respective initial stratigraphic layering index; and
        for each second pillar intercepted by the second region, determining a respective second stratigraphic layering value by interpolating first stratigraphic layering values;

the process further comprising performing one or more physical actions on a geological environment based on a result of the one or more iterations of the method.

2. The process of claim 1, wherein the at least one geological unit comprises several geological units that form the reservoir, the method further comprising determining, for each cell of the pseudo-stratigraphic grid, a respective global stratigraphic layering index based on the respective local stratigraphic layering index and on a global recombination scheme.

3. The process of claim 1, wherein the second region presents a discontinuity.

4. The process of claim 3, wherein the geological structure is a fault or an unconformity.

5. The process of claim 4, wherein the method comprises detecting faulted cells of the top or the base based on topology of the pseudo-stratigraphic grid.

6. The process of claim 1, wherein the respective stratigraphic style is a true iso-proportional style.

7. The process of claim 1, wherein at least one of the top 2D map and the base 2D map each output, for each pillar intercepting the at least one geological unit, a respective value, base of a vertical positioning measure, the calculating including:
    establishing a respective pseudo relative depositional time based on a comparison between a respective value of the vertical positioning measure at the cell and the respective value outputted by at least one of the first and base 2D map; and converting the respective pseudo relative depositional time into the respective local stratigraphic layering index based on at least one of the gridding constraint and a comparison between the top 2D map and the base 2D map;

the establishing and the converting being performed further based on the respective stratigraphic style.

8. The process of claim 7, wherein at least one of: (i) the respective stratigraphic style is a true iso-proportional style or an iso-proportional with geometrical option style and (ii) the gridding constraint is a target number of cells, the converting including multiplying the target number of cells with the respective pseudo relative depositional time.

9. The process of claim 7, wherein at least one of: (i) the respective stratigraphic style is a follow-top style or a follow-base style, and (ii) the gridding constraint is a target cell thickness, the converting including multiplying a max of the difference between the top 2D map and the base 2D map with the respective pseudo relative depositional time, divided by the target cell thickness.

10. A non-transitory data storage medium having recorded thereon a computer program comprising instructions for performing a computer-implemented method of geomodeling, the method comprising:

providing a pseudo-stratigraphic grid representing a reservoir having geological units, the pseudo-stratigraphic grid having pillars, each pillar including respective cells, each geological unit being represented by a respective portion of the pseudo-stratigraphic grid and having a respective top, a respective base, and a respective stratigraphic style;

for at least one geological unit:

computing a top 2D map representing the respective top and a base 2D map representing the respective base;

defining a gridding constraint depending on the respective stratigraphic style; and for each cell of the respective portion, calculating a respective local stratigraphic layering index based on the top 2D map, on the base 2D map, on the gridding constraint and on the respective stratigraphic style;

providing, for each cell of the respective portion, a respective initial stratigraphic layering index; and replacing the respective initial stratigraphic layering index:

wherein:

at least one of the top and the base has a first region and a second region complementary to the first region, at least one of the top and the base 2D map outputs, for each cell of at least one of the top and the base, a respective local stratigraphic value, and the computing of at least one of the top and the base 2D map includes:

for each first cell of the first region, determining a respective first stratigraphic layering index based on the respective initial stratigraphic layering index; and for each second pillar intercepted by the second region, determining a respective second stratigraphic layering value by interpolating first stratigraphic layering values;

the non-transitory data storage medium being configured to be used in a process, the process comprising performing one or more iterations of the method and performing one or more physical actions on a geological environment based on a result of the one or more iterations of the method.

11. The data storage medium of claim 10, wherein the at least one geological unit comprises several geological units that form the reservoir, the method further comprising determining, for each cell of the pseudo-stratigraphic grid, a respective global stratigraphic layering index based on the respective local stratigraphic layering index and on a global recombination scheme.

12. The data storage medium of claim 10, wherein the second region presents a discontinuity;

and wherein the geological structure is a fault or an unconformity;

and wherein the method comprises detecting faulted cells of the top or the base based on topology of the pseudo-stratigraphic grid.

13. A system comprising a processor coupled to a memory, the memory having recorded thereon a computer program comprising instructions for performing a computer-implemented method of geomodeling, the method comprising:

providing a pseudo-stratigraphic grid representing a reservoir having geological units, the pseudo-stratigraphic grid having pillars, each pillar including respective cells, each geological unit being represented by a respective portion of the pseudo-stratigraphic grid and having a respective top, a respective base, and a respective stratigraphic style;

for at least one geological unit:

computing a top 2D map representing the respective top and a base 2D map representing the respective base;

defining a gridding constraint depending on the respective stratigraphic style; and for each cell of the respective portion, calculating a respective local stratigraphic layering index based on the top 2D map, on the base 2D map, on the gridding constraint and on the respective stratigraphic style;

providing, for each cell of the respective portion, a respective initial stratigraphic layering index; and replacing the respective initial stratigraphic layering index;

wherein:

at least one of the top and the base has a first region and a second region complementary to the first region, at least one of the top and the base 2D map outputs, for each cell of at least one of the top and the base, a respective local stratigraphic value, and the computing of at least one of the top and the base 2D map includes:

for each first cell of the first region, determining a respective first stratigraphic layering index based on the respective initial stratigraphic layering index; and for each second pillar intercepted by the second region, determining a respective second stratigraphic layering value by interpolating first stratigraphic layering values;

the system being configured to be used in a process, the process comprising performing one or more iterations of the method and performing one or more physical actions on a geological environment based on a result of the one or more iterations of the method.

14. The system of claim 13, wherein the at least one geological unit comprises several geological units that form the reservoir, the method further comprising determining, for each cell of the pseudo-stratigraphic grid, a respective global stratigraphic layering index based on the respective local stratigraphic layering index and on a global recombination scheme.

15. The system of claim 13, wherein the second region presents a discontinuity;

and wherein the geological structure is a fault or an unconformity;

and wherein the method comprises detecting faulted cells of the top or the base based on topology of the pseudo-stratigraphic grid.

16. The process of claim 3, wherein the reservoir comprises a geological structure which intersects the surface and yields the discontinuity.

17. The data storage medium of claim 12, wherein the reservoir comprises a geological structure which intersects the surface and yields the discontinuity.

18. The system of claim 15, wherein the reservoir comprises a geological structure which intersects the surface and yields the discontinuity.

\* \* \* \* \*